(12) United States Patent
Okajima et al.

(10) Patent No.: US 11,983,633 B2
(45) Date of Patent: May 14, 2024

(54) MACHINE LEARNING PREDICTIONS BY GENERATING CONDITION DATA AND DETERMINING CORRECT ANSWERS

(71) Applicant: NEC CORPORATION, Tokyo (JP)

(72) Inventors: Yuzuru Okajima, Tokyo (JP); Kunihiko Sadamasa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 926 days.

(21) Appl. No.: 16/976,648

(22) PCT Filed: Mar. 1, 2018

(86) PCT No.: PCT/JP2018/007888
§ 371 (c)(1),
(2) Date: Aug. 28, 2020

(87) PCT Pub. No.: WO2019/167240
PCT Pub. Date: Sep. 6, 2019

(65) Prior Publication Data
US 2020/0410361 A1 Dec. 31, 2020

(51) Int. Cl.
*G06N 3/08* (2023.01)
*G06F 17/18* (2006.01)
*G06F 18/24* (2023.01)
*G06F 18/25* (2023.01)
*G06N 3/084* (2023.01)
*G06V 10/764* (2022.01)

(52) U.S. Cl.
CPC .............. *G06N 3/084* (2013.01); *G06F 17/18* (2013.01); *G06F 18/24765* (2023.01); *G06F 18/251* (2023.01); *G06V 10/764* (2022.01); *G06V 10/765* (2022.01)

(58) Field of Classification Search
CPC ........ G06N 5/025; G06N 5/045; G06N 17/18; G06F 18/24765; G06F 18/251
See application file for complete search history.

(56) References Cited

U.S. PATENT DOCUMENTS

| 6,289,329 B1* | 9/2001 | Sethi ..................... G06N 3/042 706/26 |
| 10,824,959 B1* | 11/2020 | Chatterjee .............. G06N 20/00 |
| 2004/0044475 A1 | 3/2004 | Oka et al. |
| 2018/0158552 A1* | 6/2018 | Liu ........................ G06N 3/045 |

FOREIGN PATENT DOCUMENTS

| JP | 07-160662 A | 6/1995 |
| JP | 2003-027567 A | 1/2003 |

OTHER PUBLICATIONS

Maruan Al-Shedivat et al., "Contextual Explanation Networks", [online] , May 29, 2017, arXiv, [Retrieved Mar. 1, 2018], internet<URL:https://arxiv.org/abs/1705.10301>.
(Continued)

*Primary Examiner* — Hal Schnee

(57) ABSTRACT

An information processing apparatus (2000) acquires input data (10) and generates, by use of a neural network (30), condition data (50) that indicate one or more conditions satisfied by the input data (10). The information processing apparatus (2000) determines prediction data (20) by use of a value determined based on correct answer data (42) associated with example data (40) that satisfy at least a part of conditions indicated by the condition data (50).

15 Claims, 21 Drawing Sheets

(56) References Cited

OTHER PUBLICATIONS

Jan Ruben Zilke et al., "DeepRED—Rule Extraction from Deep Neural Networks", Discovery Science, Springer, Cham, 2017, pp. 1-16, vol. 9956.
Satoru Kato et al., "A Basic Study on Hierarchical Clustering by using 2-Stage Self Organizing Map", IEICE Technical Report, Mar. 15, 2006, pp. 27-31, vol. 105, No. 677, (SIS2005-64) ISSN 0913-5685.
International Search Report for PCT/JP2018/007888, dated May 29, 2018.

\* cited by examiner

| EXAMPLE DATA 202 | | CORRECT ANSWER DATA 204 |
|---|---|---|
| x1 | x2 | |
| 2 | 3 | B |
| 5 | 2 | A |
| 4 | 10 | B |
| −3 | 4 | A |

| EXAMPLE DATA 202 | | | | CORRECT ANSWER DATA 204 |
|---|---|---|---|---|
| C1 | C2 | C3 | C4 | |
| 1 | −1 | 1 | −1 | B |
| 1 | 1 | 1 | −1 | A |
| −1 | −1 | −1 | 1 | B |
| 1 | −1 | 1 | −1 | A |

SET OF ACQUIRED CORRECT ANSWER DATA
A, A, B, A, A, B, A, A, C, B

MODE

PREDICTION DATA
A

FIG. 16

SET OF ACQUIRED CORRECT ANSWER DATA
1.8, 1.9, 2.0, 1.8. 1.7, 1.8, 2.0, 2.2, 2.1

↓ AVERAGE

PREDICTION DATA
1.92

MACHINE LEARNING PREDICTIONS BY GENERATING CONDITION DATA AND DETERMINING CORRECT ANSWERS

CROSS REFERENCE TO RELATED APPLICATIONS

This application is a National Stage of International Application No. PCT/JP2018/007888 filed Mar. 1, 2018.

TECHNICAL FIELD

The present invention relates to prediction using a neural network.

BACKGROUND ART

In the field of machine learning, a rule-based model, which combines a plurality of simple conditions, has an advantage in that the model is easy to interpret. A typical example of the rule-based model is a decision tree. Each node of a decision tree represents a simple condition, and tracking the decision tree from the root node to a leaf node is equivalent to performing prediction by use of a determination rule into which a plurality of simple conditions are combined.

On the other hand, machine learning using a complex model, such as a neural network, exhibits a high prediction performance and has drawn attention. In particular, such machine learning exhibits a higher prediction performance than the rule-based model, such as the decision tree, for data having complex representation, such as images and texts.

A drawback of a complex model, such as a neural network, is that it is difficult to interpret an inference process because the internal structure of the model is complicated. That is, the drawback is that it is difficult for a person to understand the reason for the prediction. For example, a case of performing binary classification, which outputs YES or NO, is considered. The neural network is capable of outputting whether a determination result is YES or NO with high precision. However, the process of determining whether YES or NO is complicated, and it is difficult for a person to understand the reason for the determination.

In the above-described technical field, Non-Patent Document 1 discloses a technology of, in place of directly using a neural network for prediction, making the neural network adjust parameters of a graphical model. Use of the technology enables, in place of a neural network, a graphical model, which is a simpler model than the neural network, to be presented to a person.

Non-Patent Document 2 discloses a technology of approximating the structure of a trained neural network by a decision tree. Use of the technology enables a decision tree that performs operation imitating a neural network to be presented to a person if the neural network is such a simple neural network that can be approximated by a decision tree.

RELATED DOCUMENTS

Non-Patent Documents

[Non-Patent Document 1] Maruan Al-Shedivat, Avinava Dubey, and Eric P. Xing, "Contextual Explanation Networks", [online], May 29, 2017, arXiv, [retrieved on Mar. 1, 2018], Internet: <URL: https://arxiv.org/abs/1705.10301>

[Non-Patent Document 2] Jan Ruben Zilke, Eneldo Loza Mencia, and frederik Janssen, "DeepRED—Rule Extraction from Deep Neural Networks", Discovery Science, Springer, Cham, 2017, vol 9956

SUMMARY OF THE INVENTION

Technical Problem

In the prior art, easiness of interpretation and high prediction precision cannot be achieved at the same time. For example, the graphical model disclosed in Non-Patent Document 1 has a problem in that, since the graphical model cannot be broken down into a combination of simple conditions, interpretation of the model is difficult. The technology described in Non-Patent Document 2 has a problem in that, since usable neural network models are limited to such a simple model that can be approximated by a decision tree, only low prediction performance can be expected.

The present invention has been made in consideration of the above-described problems, and an object of the present invention is to achieve prediction that enables the reason for the prediction to be easily interpreted and has high precision.

Solution to Problem

An information processing apparatus according to the present invention includes 1) an acquisition unit that acquires input data, 2) a generation unit that generates, by use of a neural network, condition data that indicate one or more conditions satisfied by the input data, and 3) a determination unit that determines, as prediction data associated with the input data, a value determined based on correct answer data associated with example data that satisfy at least a part of conditions indicated by the condition data.

A control method according to the present invention is performed by a computer. The control method includes 1) an acquisition step of acquiring input data, 2) a generation step of generating, by use of a neural network, condition data that indicate one or more conditions satisfied by the input data, and 3) a determination step of determining, as prediction data associated with the input data, a value determined based on correct answer data associated with example data that satisfy at least a part of conditions indicated by the condition data.

A program according to the present invention causes a computer to perform each step that the control method according to the present invention includes.

Advantageous Effects of Invention

The present invention enables prediction that enables the reason for the prediction to be easily interpreted and has high precision to be achieved.

BRIEF DESCRIPTION OF THE DRAWINGS

The above-described object and other objects, features, and advantages will be more apparent by the preferred example embodiments described below and the following drawings accompanying therewith.

FIG. 13 is a diagram illustrating a configuration of example information in a table form;

FIG. 14 is a diagram illustrating another example of the example information;

FIG. 15 is a diagram illustrating prediction data when a classification problem is dealt with;

FIG. 16 is a diagram illustrating prediction data when a regression problem is dealt with;

DESCRIPTION OF EXEMPLARY EMBODIMENTS

Hereinafter, example embodiments of the present invention will be described by use of the drawings. In all the drawings, the same signs are assigned to the same constituent elements, and a description thereof will not be repeated. Unless specifically described, in block diagrams, each block represents a component as a functional unit instead of a hardware unit.

First Example Embodiment

<Outline>

Figure 1:
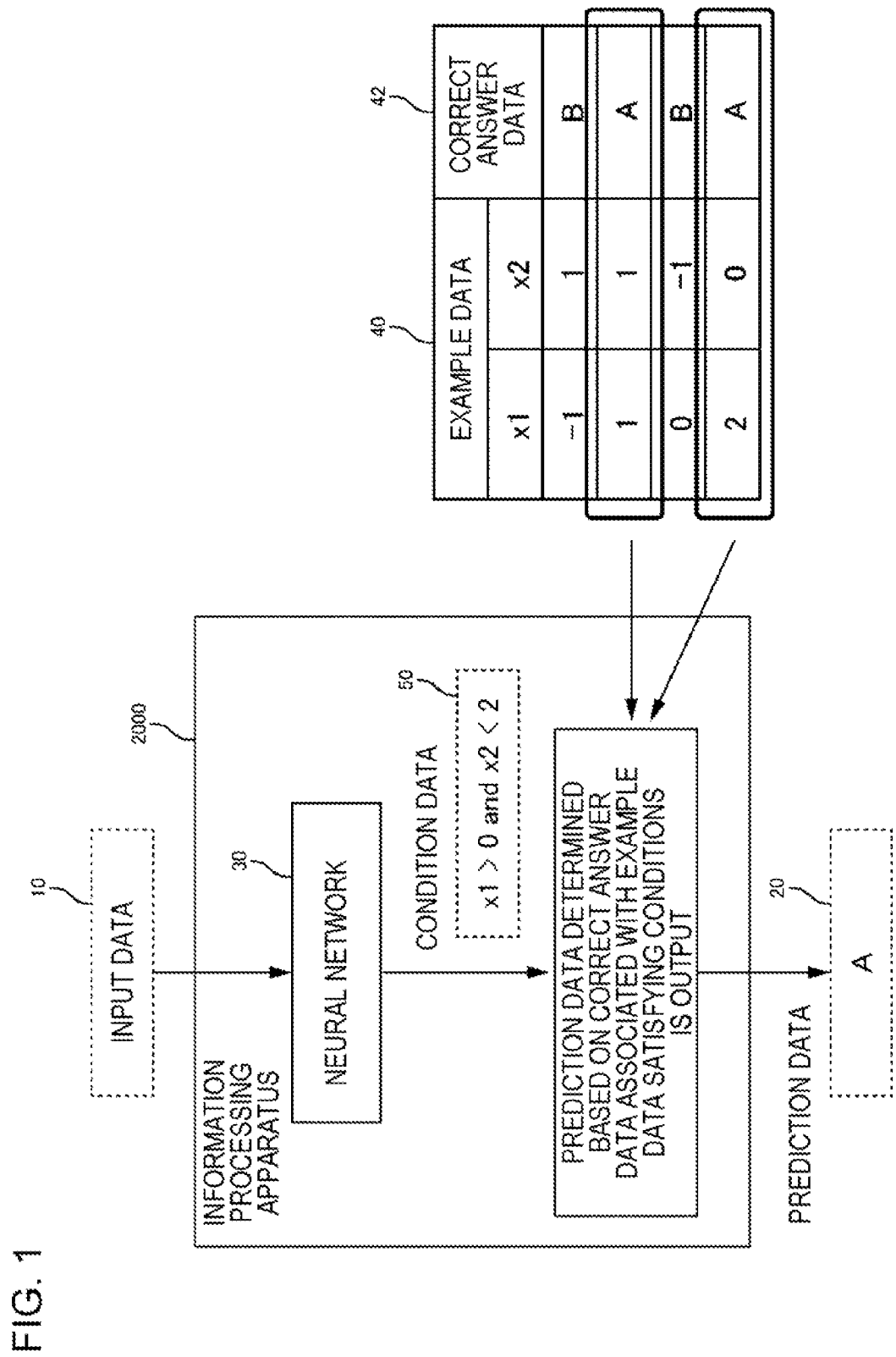
FIG. 1 is a diagram conceptually illustrating processing performed by an information processing apparatus of the present example embodiment.

FIG. 1 is a diagram conceptually illustrating processing performed by an information processing apparatus of the present example embodiment. An information processing apparatus 2000 outputs a prediction relating to data that are input. In FIG. 1, data that are input are input data 10, and data that represent a result of prediction are prediction data 20. Examples of processing for performing prediction for input include processing for predicting the class (for example, a person class, a dog class, or a vehicle class) of an object included in input image data (classification problem). In this case, the input image data are the input data 10, and the predicted class is the prediction data 20.

When acquiring input data 10, the information processing apparatus 2000 generates, by use of a neural network (NN) 30, condition data 50 that represent conditions that the input data 10 satisfy. For example, it is assumed that, as the input data 10, two-dimensional data expressed as "x1=0.5, x2=1.5" are input. In this case, as conditions that the input data 10 satisfy, conditions expressed as "x1>0 and x2<2" are conceivable. Thus, for example, the neural network 30 generates condition data expressed as "x1>0 and x2<2" with respect to the input data expressed as "x1=0.5, x2=1.5". As described above, a condition that is expressed by a combination of an element name, a threshold value, and an inequality sign enables a person to easily understand the meaning of the condition (that is, interpretation of the condition is easy).

Note that, as will be described later, elements (the above-described x1 and x2) that are constrained by the condition data 50, instead of having values directly indicated by the input data 10, may be features extracted from the input data 10 (for example, feature values extracted from image data). In this case, after the features have been extracted from the input data 10, condition data 50 that represent conditions relating to the features are generated. Details on the feature extraction will be described later.

The information processing apparatus 2000 determines prediction data 20 by use of example data 40. For example, the example data 40 indicate values of one or more features described above. With each piece of the example data 40, a piece of correct answer data 42 that represents a correct answer corresponding to features indicated by the piece of the example data 40 is associated. For example, it is assumed that, as described above, classification of an object included in image data is performed. In this case, sets of features extracted from image data with respect to which correct answers have been obtained are listed as example data 40, and correct answer data 42 representing the correct answers are associated with the example data 40.

The information processing apparatus 2000 outputs, as prediction data 20, a value determined based on correct answer data 42 that are associated with example data 40 satisfying at least some of the condition(s) indicated by the condition data 50. The value may be a value determined by the information processing apparatus 2000 or a value that has been computed in advance.

In FIG. 1, as an example, a case where the information processing apparatus 2000 computes prediction data 20 by use of correct answer data 42 that are associated with example data 40 is illustrated. Note that, in the following description, a case of determining example data 40 that satisfy all the conditions that condition data 50 indicate will be described, unless otherwise stated. A case of using example data 40 that satisfy some of the conditions that condition data 50 indicate will be described later.

The information processing apparatus 2000 determines example data 40 that satisfy the conditions that the condition data 50 indicate and acquires correct answer data 42 associated with the determined example data 40. In FIG. 1, there exist two pieces of example data 40 that satisfy the conditions expressed as "x1>0 and x2<2" that the condition data 50 indicate, and both pieces of correct answer data 42 that are associated with the two pieces of example data 40 are "A". Thus, the information processing apparatus 2000 computes prediction data 20 expressed as "A".

Determining the prediction data 20 expressed as "A" from the condition data 50 expressed as "x1>0 and x2<2" is equivalent to generating a prediction rule expressed as "x1>0 and x2<2→A". It can be said that such a prediction rule is a rule that is easy for a person to interpret. That is, it can be said that the information processing apparatus 2000 is an information processing apparatus that, in response to input of input data 10, dynamically generates a prediction rule that is easy to interpret and outputs prediction data 20 predicted in accordance with the prediction rule.

Note that, in FIG. 1, for the purpose of making the description clearer, respective example data 40 that satisfy a condition(s) indicated by the condition data 50 are associated with correct answer data 42 that indicate the same value as each other. However, as will be described later, respective example data 40 that satisfy a condition(s) indicated by the condition data 50 do not necessarily have to be associated with correct answer data 42 that indicate the same value as each other. Including a description of such a case, a specific method for determining prediction data 20 by use of correct answer data 42 will be described later.

Figure 2:
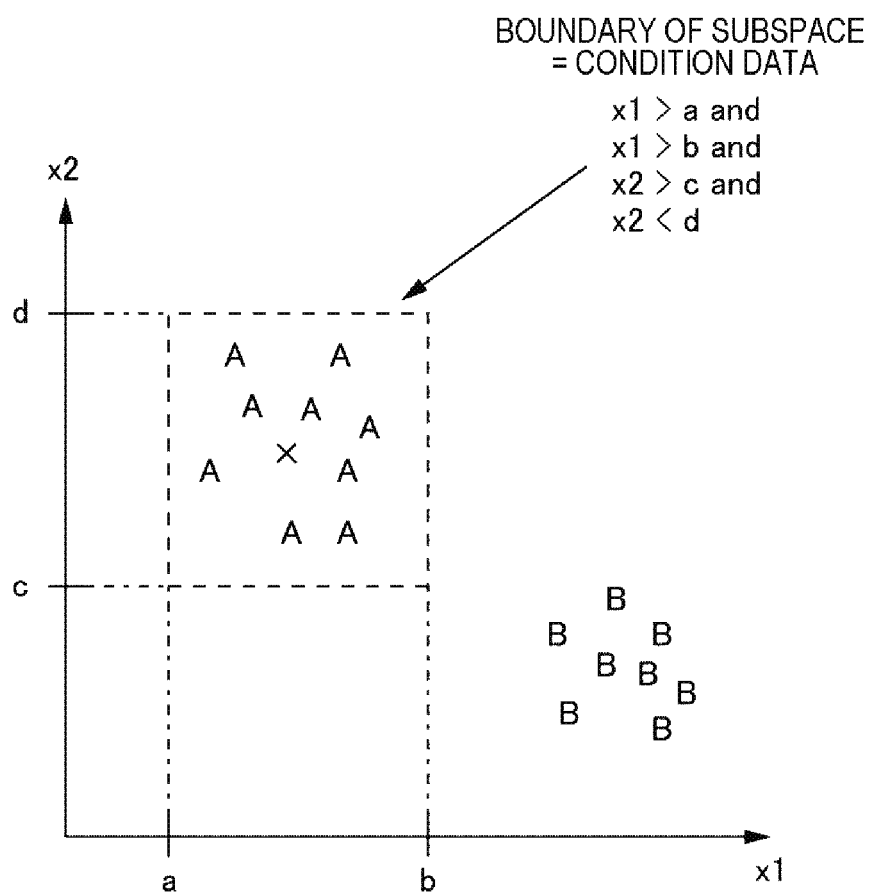
FIG. 2 is a diagram illustrating a two-dimensional feature space.

Conceptually, generating condition data 50 is equivalent to determining a subspace to which a set of feature(s) extracted from input data 10 belongs out of the feature space spanned by one or more features. FIG. 2 is a diagram illustrating a two-dimensional feature space. A cross mark represents input data 10. In addition, marks "A" represent example data 40 the associated correct answer data of which are A, and marks "B" represent example data 40 the associated correct answer data of which are B. The information processing apparatus 2000 determines a subspace to which the input data 10 belong by generating condition data 50 corresponding to the input data 10 by use of the neural network 30. The condition data 50 represent the subspace.

It can be expected that, for sets of features that belong to the same subspace (that is, sets of features that resemble one another), corresponding outputs are also the same. Thus, the information processing apparatus 2000 determines prediction data 20 corresponding to the input data 10 by use of correct answer data 42 associated with respective example data 40 that belong to the same subspace as features extracted from the input data 10 (that is, example data 40 that satisfy a condition(s) indicated by the condition data 50).

Advantageous Effects

In order to make clearer advantageous effects achieved by the information processing apparatus 2000 of the present example embodiment, a decision tree and a graphical model, which are base technologies in the technical field, will be described.

Figure 3:
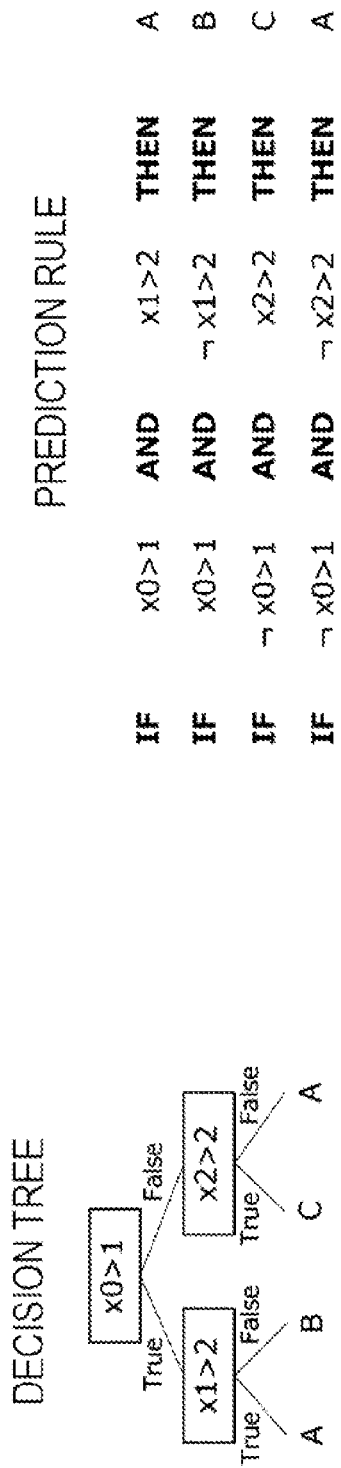
FIG. 3 is a diagram illustrating an example of a decision tree and prediction rules equivalent to the decision tree.

FIG. 3 is a diagram illustrating an example of the decision tree and prediction rules equivalent to the decision tree. Each internal node in the decision tree represents a condition and has two child nodes that respectively correspond to the truth and falsehood of the condition. In the decision tree, when data is input, search is initiated from the root node. When a condition is true with respect to the input data, the child node corresponding to truth and its descendant nodes are further searched, and, when the condition is false, the child node corresponding to falsehood and its descendant nodes are further searched. When the search is repeated and reaches a leaf node, a predicted value that the leaf node has is output as a prediction result.

Each path starting from the root of the decision tree and reaching a leaf node thereof can be interpreted to be a prediction rule constituted by a condition part and a conclusion part. The condition part is expressed by a compound condition into which conditions included in internal nodes that a path from the root node to a leaf node passes are joined by a negation(s) and a logical product(s) (AND). In the example in FIG. 3, four prediction rules corresponding to four leaf nodes that the decision tree has are illustrated.

Such prediction rules equivalent to a decision tree are easy for a person to interpret. This is because it is possible to consider a prediction rule as a combination of simple conditions each of which relates to one element. This is also because, since the truth or falsehood of each condition is not influenced by the other conditions, a person can easily determine the truth or falsehood of each condition. To take the case of FIG. 3 as an example, in order to determine whether "x0>1" holds, it is only necessary to confirm the value of an element x0 and not necessary to take into account an element x1, which is one of the other elements. The result of determination of whether the above condition holds is expressed as either being true or being false, and there is no ambiguity in the determination.

When each of the conditions is constituted by an element and a threshold value, a meaning that the threshold value itself has is easy to understand and the meaning of a compound condition into which the conditions are combined also becomes easy to understand.

For example, it is assumed that, in failure prediction of a machine, observation data represent temperature and humidity. In this case, it is also assumed that a prediction rule stating that 'when a condition expressed as "temperature>45 and humidity>70" holds, the machine fails' is obtained. This prediction rule provides intuitively understandable information stating that "when the temperature rises higher than 45 degrees and the humidity exceeds 70%, the machine fails", which is useful for users.

On the other hand, when a prediction rule is generated by use of a condition relating to a value computed by combining a plurality of elements, interpretation of the rule becomes difficult. For example, it is assumed that there is a prediction rule stating that 'when a condition expressed as "3.5×temperature+1.9×humidity>23" holds, the machine fails'. In this case, since the threshold value of 23 is not a value that directly represents temperature or humidity, it is difficult to intuitively understand the meaning of the value. That is, only referring to the prediction rule is not sufficient for a person to easily recognize at what temperature and humidity there is a possibility that a machine has failed.

The decision tree, while having the advantage of being easy to interpret, has a disadvantage of having a comparatively low prediction performance. In order to eliminate the disadvantage, a decision tree the prediction performance of which is increased by using, as a node, a complicated condition including a lot of elements has been proposed. However, complicating a decision tree, while improving prediction performance, causes the advantage of being easy to interpret to be lost.

Figure 4:
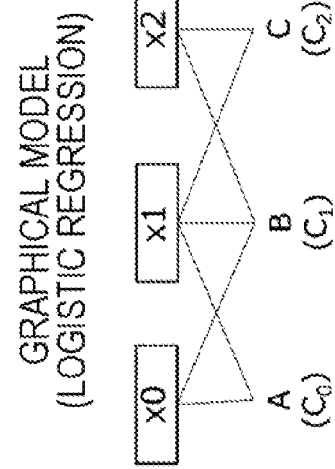
FIG. 4 is a diagram illustrating an example of a graphical model and a prediction formula corresponding to the graphical model.

Next, the graphical model will be described. FIG. 4 is a diagram illustrating an example of the graphical model and a prediction formula corresponding to the graphical model. The graphical model illustrated in FIG. 4 is one of simplest graphical models, which are referred to as logistic regression. In the prediction formula, $w_0$, $w_1$, and $w_2$ are weight vectors to predict classes $C_0$, $C_1$, and $C_2$, respectively.

In such a graphical model, each element takes continuous values, each element is multiplied by a weight that takes continuous values, and a prediction result is determined based on the sum of the weighted elements. Therefore, a prediction rule (prediction formula) corresponding to the graphical model is difficult for a person to interpret. For example, since the importance of each element is determined based on the relative amount of the weight of the element to those of other elements, the importance of each element cannot be determined independently.

To take the case of the afore-described failure prediction as an example, the only prediction formula that the graphical model can indicate is a prediction formula into which the values of temperature and humidity are combined in a complicated manner, and the graphical model cannot generate a prediction formula enabling an intuitive understanding stating that "when the temperature rises higher than 45 degrees and the humidity exceeds 70%, the machine fails".

Consequently, 1) the decision tree, although having the advantage that interpretation of a prediction rule is easy, has a problem in that prediction performance is low, and 2) the graphical model, although having the advantage that prediction performance is high, has a problem in that interpretation of a prediction rule is difficult.

In this respect, the information processing apparatus 2000 of the present example embodiment generates, in response to input of input data 10, condition data 50 as a combination of simple conditions (for example, a threshold condition relating to an element) and determines, by use of correct answer data 42 determined based on the condition data 50, prediction data 20. In the above processing, the input data 10 satisfy conditions that the condition data 50 indicate. Therefore, a correspondence relationship between the condition data 50 and the prediction data can be considered to be a relationship between a condition part and a conclusion part. That is, prediction that the information processing apparatus 2000 performs is equivalent to prediction performed in accordance with a prediction rule that is constituted by a condition part made up of a combination of simple conditions and a conclusion part indicating prediction data 20 derived from the conditions. Thus, the information processing apparatus 2000 enables a prediction rule that is easy for a person to interpret to be provided to users.

Further, the information processing apparatus 2000 uses the neural network 30 for generation of the condition data 50. In general, a neural network has a higher prediction precision than a decision tree. Thus, use of the information processing apparatus 2000, while enabling a prediction rule that is easy to understand like a decision tree to be provided to users, enables prediction with high precision to be performed.

One of important advantages that the information processing apparatus 2000 has is that "there is no limit to the complexity of the model of the neural network 30". In the method in which a neural network is simplified and approximated by a decision tree (see Non-Patent Document 2), there is a limitation in that only a neural network based on such a simple model that can be approximated by a decision tree can be used. Therefore, it is difficult to increase prediction precision.

In this respect, the information processing apparatus 2000, instead of making the neural network directly output prediction data 20, makes the neural network output conditions that are used for determining the prediction data 20. Thus, since the neural network itself does not represent a prediction rule, it is not required that the neural network to be used can be approximated to a decision tree. Therefore, it is possible to use a neural network of any complexity.

Note that the above description with reference to FIG. 1 is an exemplification for facilitating understanding of the information processing apparatus 2000 and does not limit the functions of the information processing apparatus 2000. The information processing apparatus 2000 of the present example embodiment will be described below in more detail.

<Example of Functional Configuration of Information Processing Apparatus 2000>

Figure 5:
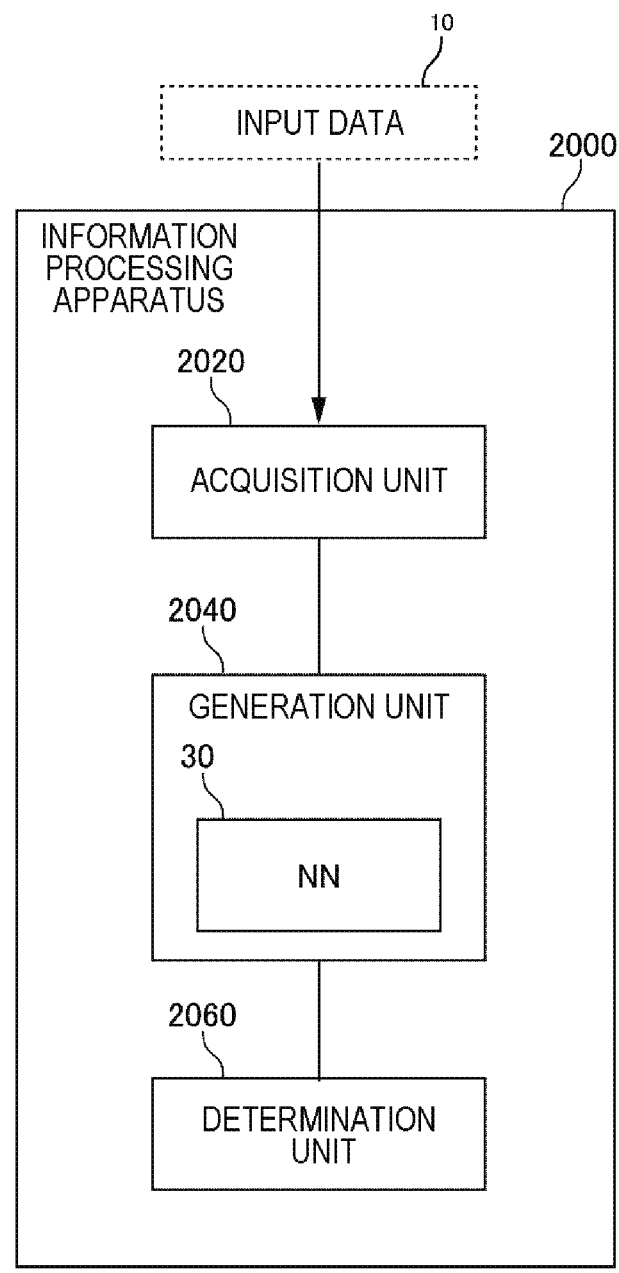
FIG. 5 is a diagram illustrating a functional configuration of the information processing apparatus of a first example embodiment.

FIG. 5 is a diagram illustrating a functional configuration of the information processing apparatus 2000 of the first example embodiment. The information processing apparatus 2000 includes an acquisition unit 2020, a generation unit 2040, and a determination unit 2060. The acquisition unit 2020 acquires input data 10. The generation unit 2040 generates, by use of the neural network 30, condition data 50. The condition data 50 are a combination of one or more conditions that the input data 10 satisfy. The determination unit 2060 determines, as prediction data 20, a value determined based on correct answer data 42 associated with example data 40 that satisfy at least some of the condition(s) indicated by the condition data 50.

<Hardware Configuration of Information Processing Apparatus 2000>

The functional constituent units of the information processing apparatus 2000 may be achieved by hardware (for example, hardwired electronic circuits) that achieves the functional constituent units or achieved by a combination of hardware and software (for example, a combination of an electronic circuit and a program controlling the electronic circuit). In the following description, a case where the functional constituent units of the information processing apparatus 2000 are achieved by a combination of hardware and software will be further described.

Figure 6:
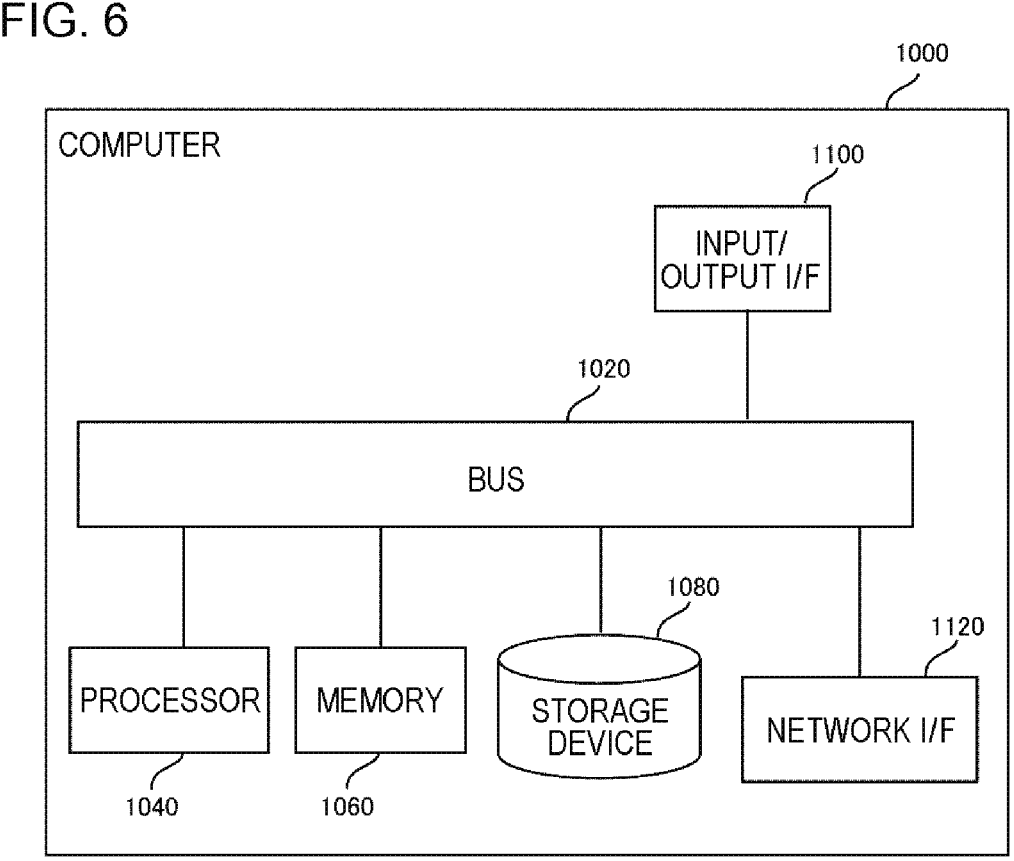
FIG. 6 is a diagram illustrating a computer for achieving the information processing apparatus.

FIG. 6 is a diagram illustrating a computer 1000 for achieving the information processing apparatus 2000. The computer 1000 is any computer. For example, the computer 1000 is a personal computer (PC), a server machine, or the like. The computer 1000 may be a dedicated computer designed to achieve the information processing apparatus 2000 or a general-purpose computer.

The computer 1000 includes a bus 1020, a processor 1040, a memory 1060, a storage device 1080, an input/output interface 1100, and a network interface 1120. The bus 1020 is a data transmission line through which the processor 1040, the memory 1060, the storage device 1080, the input/output interface 1100, and the network interface 1120 transmit and receive data to and from one another. However, a method for interconnecting the processor 1040 and the like is not limited to the bus connection.

The processor 1040 is one of various types of processors, such as a central processing unit (CPU), a graphics processing unit (GPU), and a field-programmable gate array (FPGA). The memory 1060 is a main storage apparatus achieved by use of a random access memory (RAM) or the like. The storage device 1080 is an auxiliary storage apparatus achieved by use of a hard disk, a solid state drive (SSD), a memory card, a read only memory (ROM), or the like.

The input/output interface 1100 is an interface for connecting the computer 1000 and input/output devices to each other. For example, to the input/output interface 1100, input devices, such as a keyboard, and output devices, such as a display device, are connected. The network interface 1120 is an interface for connecting the computer 1000 to a network. The network is, for example, a local area network (LAN) or a wide area network (WAN). A method by which the network interface 1120 connects to a network may be wireless connection or wired connection.

The storage device 1080 stores program modules that achieve respective functional constituent units of the information processing apparatus 2000. The processor 1040 achieves the functions corresponding to the respective program modules by reading and executing the program modules in the memory 1060.

The storage device 1080 may further store example information. Note, however, that the example information only has to be information that can be acquired from the computer 1000 and does not necessarily have to be stored in the storage device 1080. For example, the example information can be stored in a database server that is connected to the computer 1000 via the network interface 1120.

<Processing Flow>

Figure 7:
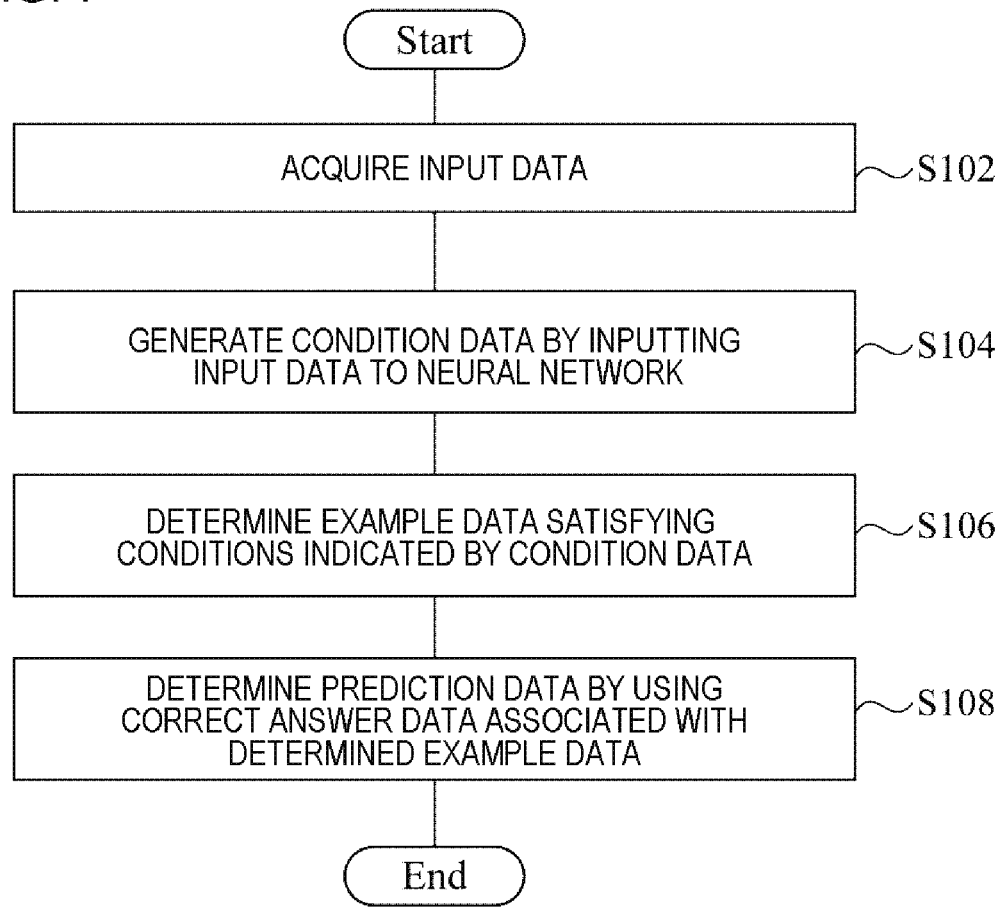
FIG. 7 is a flowchart illustrating a processing flow that is performed by the information processing apparatus of the first example embodiment.

FIG. 7 is a flowchart illustrating a processing flow that is performed by the information processing apparatus 2000 of the first example embodiment. The acquisition unit 2020 acquires input data 10 (S102). The generation unit 2040 generates, by use of the neural network 30, condition data 50 (S104). The determination unit 2060 determines example data that satisfy at least some of a condition(s) indicated by the condition data 50 (S106). The determination unit 2060 determines, by use of correct answer data 42 associated with the determined example data 40, prediction data 20 (S108).

However, the processing flow performed by the information processing apparatus 2000 is not limited to the flow illustrated in FIG. 7. For example, in a case where a value that has been determined in advance in association with conditions is used as the prediction data 20, the determination unit 2060, in place of performing the above-described steps S106 and S108, acquires a value that has been associated with a condition(s) indicated by the condition data 50 and determines the acquired value as the prediction data 20. A case where a value having been determined in advance is used as the prediction data 20 as described above will also be described later in detail.

<Acquisition of Input Data 10: S102>

The acquisition unit 2020 acquires input data 10 (S102). The input data 10 are data required to perform intended prediction. For example, as described afore, in the processing of predicting the class of an object included in image data, the image data can be used as the input data 10. Note, however, that the input data 10 is not limited to image data and any type of data, such as text data, can be set as the input data 10.

Note that pre-processing for performing feature extraction on image data or text data may be performed and one or more features (hereinafter, referred to as a feature vector) that are obtained as a result of the pre-processing may be set as the input data 10. In this case, the neural network 30, which will be described later, does not have to have a function to perform feature extraction.

The input data 10 are constituted by one or more pieces of data, which are of various types (such as numerical data, character data, and a character string data). When the input data 10 are constituted by two or more pieces of data, the input data 10 is expressed in, for example, a vector form. For example, data expressed in the form of (0.5, 1.5) are obtained as the input data 10.

As a method by which the acquisition unit 2020 acquires the input data 10, any method may be employed. For example, the acquisition unit 2020 acquires the input data 10 from a storage apparatus in which the input data 10 are stored. The storage apparatus in which the input data 10 are stored may be disposed inside the information processing apparatus 2000 or outside the information processing apparatus 2000. Alternatively, for example, the information processing apparatus 2000 acquires the input data 10 that are input through input operation performed by a user. Still alternatively, for example, the acquisition unit 2020 acquires the input data 10 by receiving the input data 10 transmitted by another apparatus.

<Generation of Condition Data 50: S104>

The generation unit 2040 generates, by use of the neural network 30, condition data 50. The neural network 30 is configured to output, in response to input of the input data 10, information required to generate the condition data 50. The configuration of the neural network 30 will be described below with specific examples.

Figure 8:
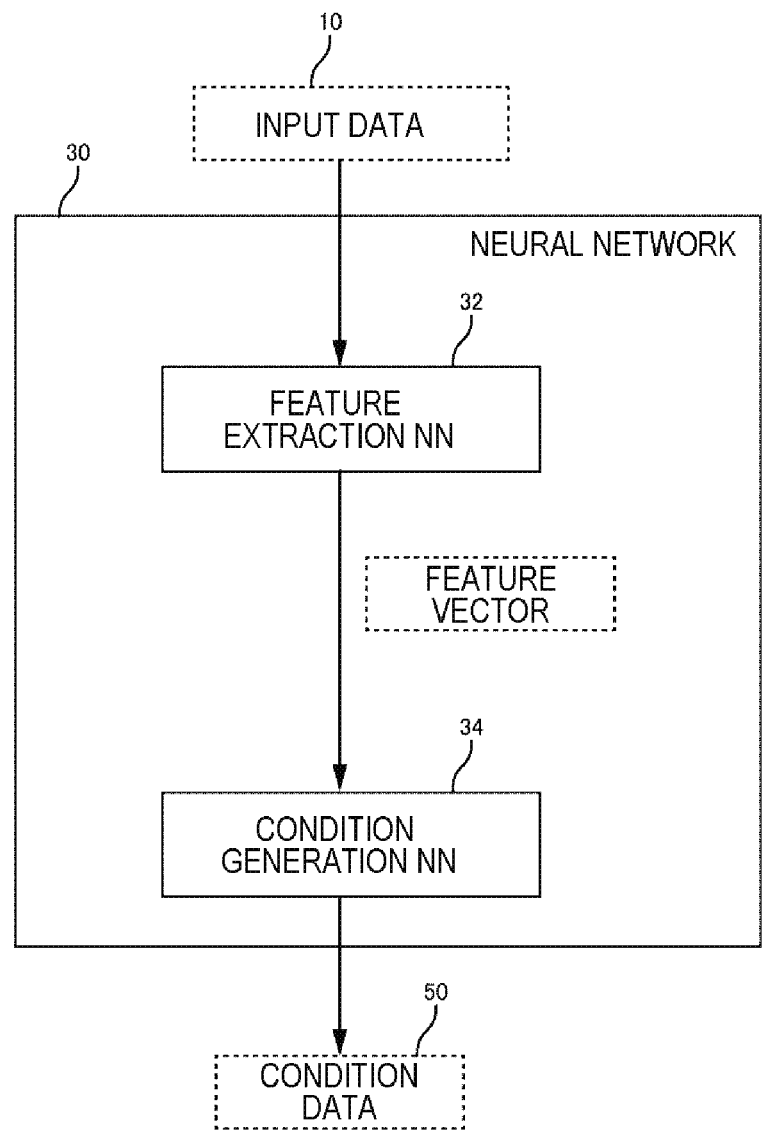
FIG. 8 is a diagram illustrating a configuration of a neural network.

FIG. 8 is a diagram illustrating a configuration the neural network 30. In FIG. 8, the neural network 30 includes a feature extraction neural network 32 and a condition generation neural network 34. Note that, as described afore, when a feature vector is input as the input data 10, the neural network 30 does not have to include the feature extraction neural network 32.

The feature extraction neural network 32 is a neural network that generates a feature vector by extracting features from the input data 10. Each output node of the feature extraction neural network 32 outputs a value of one of the elements constituting a feature vector. For example, a feature extraction layer of a convolutional neural network can be used as the feature extraction neural network 32. Note, however, that the model of the feature extraction neural network 32 is not limited to a convolutional neural network and various types of existing models (for example, a multilayer perceptron or a recurrent neural network) can be used.

The feature extraction neural network 32 is made to learn in advance to be able to extract features from the input data 10. Note that, as a technology to make a neural network learn to extract features from data, any existing technology can be used.

The condition generation neural network 34 generates, by use of a feature vector output from the feature extraction neural network 32, condition data 50. For example, the condition generation neural network 34 selects, out of candidates of conditions (hereinafter, referred to as candidate conditions) to be included in the condition data 50, one or more candidate conditions. One or more candidate conditions are defined with respect to each of the elements constituting a feature vector in advance. Conditions relating to each element of a feature vector are, for example, threshold conditions (combinations of a threshold value and an inequality sign) relating to the element.

For example, it is assumed that a feature vector F is constituted by two elements, namely x1 and x2 (that is, F=(x1, x2)). In this case, candidate conditions are combinations of "a threshold value and an inequality sign" that are determined with respect each of x1 and x2. Specifically, candidate conditions, such as "x1>0", "x1>1", "X1<0", and "x1<1", relating to x1 are defined in advance. The same applied to x2. Threshold conditions defined with respect to each element as described above are easy for a person to interpret, as described afore.

Each output node of the condition generation neural network 34 is associated with one of the candidate conditions in advance. The condition generation neural network 34 is made to learn in advance to, in response to input of a feature vector, output, from each output node, a value indicating whether the candidate condition associated with the output node is to be selected (a method of learning will be described in a second example embodiment, which will be described later).

For example, each output node of the condition generation neural network 34, when the candidate condition associated with the output node is selected in the affirmative form (natural form), outputs 1, when the candidate condition associated with the output node is selected in the negative form (negated form), outputs −1, and, when the candidate condition associated with the output node is not selected, outputs 0. "Selecting a candidate condition in the negative form" means that, when, for example, a candidate condition is "x1>0", "x1<=0", which is the negative form of "X1>0", is included in the condition data 50.

The generation unit 2040 acquires information representing a candidate condition(s) (hereinafter, referred to as candidate condition information) that correspond(s) to an output node(s) indicating that the candidate condition(s) associated with the output node(s) is/are selected (in the above-described example, an output node(s) that have/has output 1 or −1). The generation unit 2040 generates, by use of the acquired candidate condition information, condition data 50.

Figure 9:
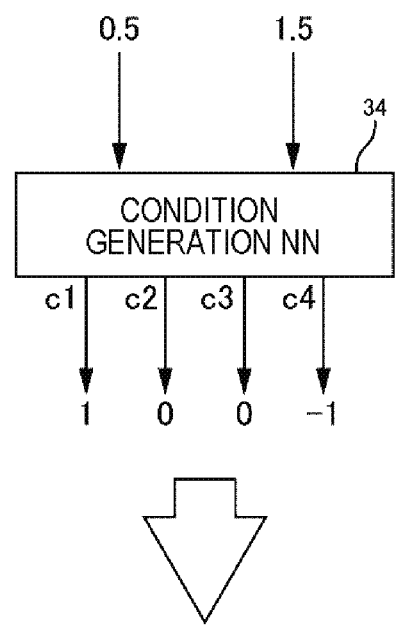
FIG. 9 is a diagram conceptually illustrating processing of generating, by use of outputs from a condition generation neural network, condition data.

FIG. 9 is a diagram conceptually illustrating processing of generating, by use of outputs from the condition generation neural network 34, condition data 50. The condition generation neural network 34 outputs, in response to input of a feature vector expressed as F=(0.5, 1.0), (c1, c2, c3, c4)=(1, 0, 0, −1). This output means that a candidate condition c1 is selected in the affirmative form and a candidate condition c4 is selected in the negative form. Therefore, the generation unit 2040 generates condition data 50 expressed as "c1 and ¬c4". Hereinafter, a vector that defines condition data 50 like (c1, c2, c3, c4) described above is referred to as a compound condition vector.

The candidate condition information is stored in advance in a storage apparatus that is accessible from the generation unit 2040. In the generation of candidate conditions, the candidate conditions may be generated by hand or by a computer. In the latter case, by, for example, combining an inequality sign selected at random with a threshold value generated at random, candidate conditions relating to each element are generated. Each of the generated candidate conditions is configured to be assigned to one of the output nodes of the condition generation neural network 34.

When candidate conditions are generated by a computer, a neural network for use in generating candidate conditions is set up separately and the candidate conditions may be generated by use of the neural network. Learning of the neural network for use in generating candidate conditions can be performed in conjunction with learning of the neural network 30, which will be described in the second example embodiment to be described later. That is, at the time of back-propagating error of prediction loss (which will be described later in detail) that is determined based on prediction data 20, which are the final output from the information processing apparatus 2000, back-propagating the error to the neural network for use in generating candidate conditions enables the training to be performed.

In the generation of the condition data, the condition generation neural network 34 may be configured to only determine whether or not to select each candidate condition without determining whether to select the candidate condition in the affirmative form or the negative form. In this case, the condition generation neural network 34, for example, outputs 1 from an output node associated with a candidate condition to be selected and outputs 0 from an output node associated with a candidate condition not to be selected. The generation unit 2040 determines, with respect to each candidate condition that is associated with an output node having output 1, whether the feature vector extracted from the input data 10 satisfies the candidate condition. The generation unit 2040 includes a candidate condition determined to be satisfied by the feature vector in the condition data 50 in the affirmative form and includes a candidate condition determined not to be satisfied by the feature vector in the condition data 50 in the negative form.

The constitution of a candidate condition is not limited to a combination of a threshold value and an inequality sign. For example, it may be configured such that a candidate condition represents only an inequality sign and a threshold value is output by the condition generation neural network 34. In this case, each output from the condition generation neural network 34 is associated with a combination of "an element in the feature vector and an inequality sign". The candidate condition information becomes information associating, with each output from the condition generation neural network 34, a combination of "an element in the feature vector and an inequality sign".

The condition generation neural network 34 is made to learn in advance to output, from an output node associated with a candidate condition to be selected, a threshold value and output, from an output node associated with a candidate condition representing an inequality sign not to be selected, a predetermined value (for example, a value representing +∞ or −∞) indicating to that effect. The generation unit 2040 associates, with respect to each output node that has output a threshold value among the output nodes of the condition generation neural network 34, the output threshold value with "an element in the feature vector and an inequality sign" associated with the output node. Note that, as a method for representing +∞ and −∞ in a pseudo manner in a computer, any existing technology can be used.

Figure 10:
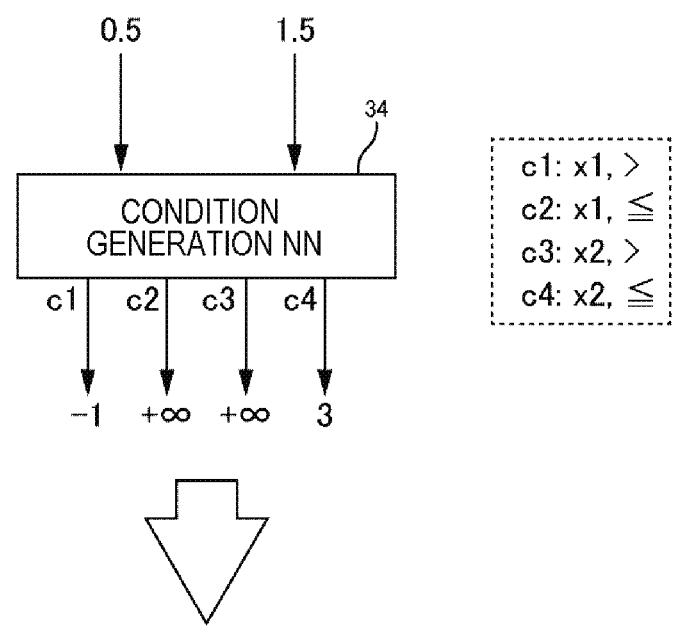
FIG. 10 is a diagram illustrating the condition generation neural network that outputs threshold values.

FIG. 10 is a diagram illustrating the condition generation neural network 34 that outputs threshold values. In the example, −1 and 3 are output from output nodes associated with "element: x1, inequality sign: >" and "element: x2, inequality sign: <=", respectively. Therefore, the generation unit 2040 generates condition data 50 expressed as "x1>−1 and x2<=3".

As a model of the condition generation neural network 34, as with the model of the feature extraction neural network 32, models of various types of existing neural networks can be used. The models of the feature extraction neural network 32 and the condition generation neural network 34 may be the same as each other or differ from each other.

The constitution of the neural network 30 is not limited to the afore-described constitution including the feature extraction neural network 32 and the condition generation neural network 34. For example, the neural network 30 may be configured as a neural network that has the functions of the feature extraction neural network 32 and the functions of the condition generation neural network 34 at the same time.

Alternatively, for example, a neural network does not necessarily have to be used for the processing of extracting feature data from the input data 10. In this case, the condition generation neural network 34 is used as the neural network 30. The generation unit 2040 performs the processing of extracting feature data from the input data 10 and generates condition data by inputting the feature data, extracted as a result of the processing, to the condition generation neural network 34. Note that, as a technology to extract features from various types of data, such as image data and text data, by use of a means other than a neural network, any existing technology can be used.

<<Detailed Specific Example of Neural Network 30>>

An example of a specific configuration of the condition generation neural network 34 will be described below. In the specific example, the model of the condition generation neural network 34 is a recurrent neural network. Hereinafter, the condition generation neural network 34 in the specific example is referred to as a condition generation RNN 70.

The condition generation RNN 70 selects K candidate condition(s) by repeating processing of selecting a candidate condition out of the candidate conditions (hereinafter, referred to as condition selection processing) K time(s). It is assumed that the total number of candidate conditions is N.

Figure 11:
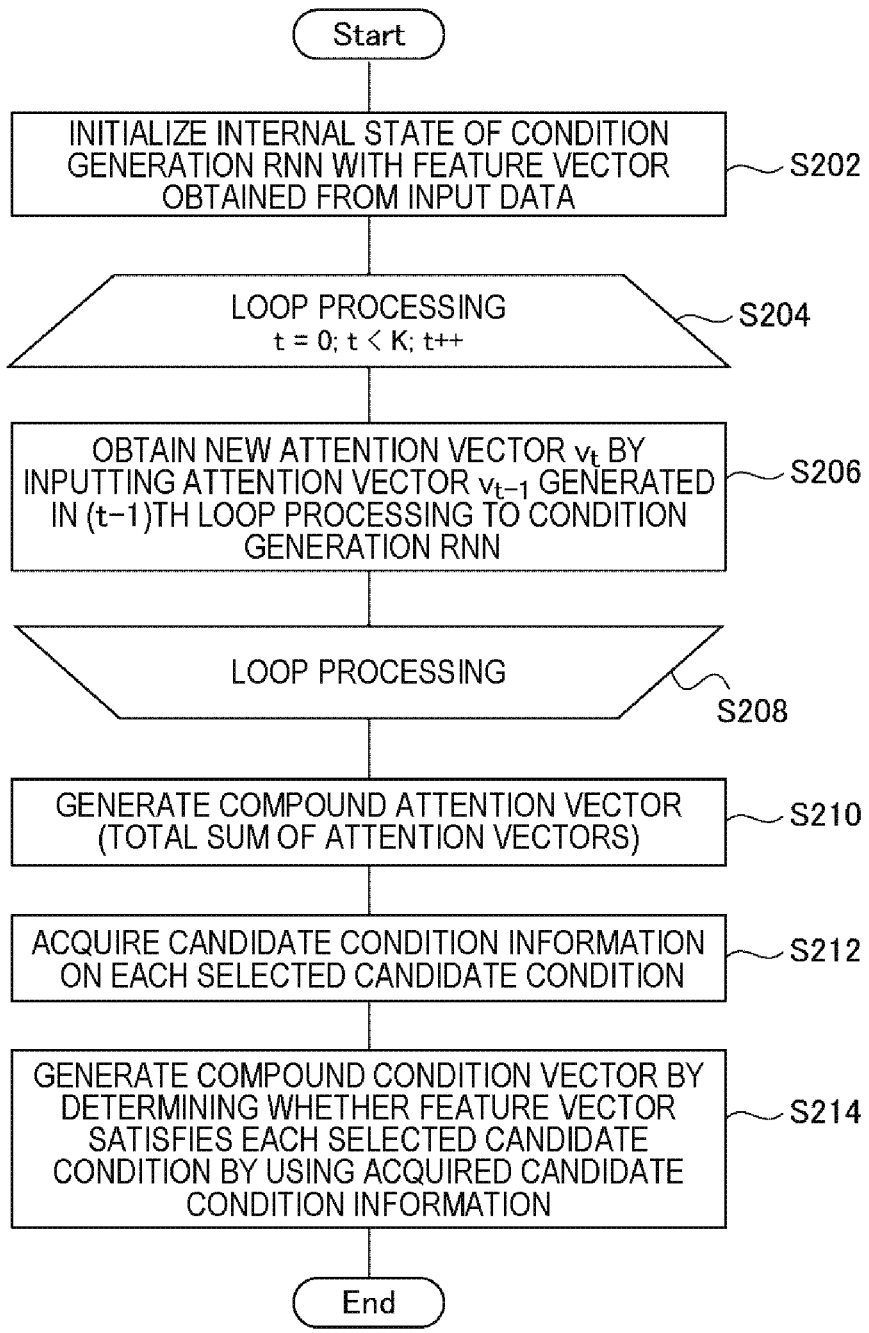
FIG. 11 is a flowchart illustrating a processing flow of selecting candidate conditions by use of a condition generation RNN.

FIG. 11 is a flowchart illustrating a processing flow of selecting a candidate condition(s) by use of the condition generation RNN 70. The generation unit 2040 sets a feature vector generated by the feature extraction neural network 32 as an initial value of an internal state vector of the condition generation RNN 70 (S202). The internal state vector is a group of internal parameters that influence outputs from the condition generation RNN 70 and is updated by operating the condition generation RNN 70.

A series of processing from S204 to S208 is loop processing. The loop processing is repeated the same number of time(s) as the number of candidate condition(s) to be selected (that is, K times). The series of processing in the loop processing represents the afore-described condition selection processing.

The generation unit 2040 obtains an attention vector by inputting an attention vector that was generated in the previous round of the loop processing to the condition generation RNN 70 (S206). A relationship between input and output to and from the condition generation neural network 34 in the t-th round of the loop processing is expressed by, for example, the formula (1).

[Math. 1]

$$v_t = RNN(v_{t-1}) \quad (1)$$

In the above formula, RNN is an expression representing the condition generation RNN 70 as a function. In the formula, $v_t$ denotes an attention vector that is output from the condition generation RNN 70 in the t-th round of the loop processing.

An attention vector is a vector having N (the total number of candidate conditions) elements, each of which corresponds to one of the candidate conditions. An attention vector has a value of 1 only for an element and values of 0 for the other elements (that is, an attention vector is a one-hot vector). An element in an attention vector the value of which is 1 represents a candidate condition selected by the condition generation RNN 70.

For example, the condition generation RNN 70 is configured to set only a value among the values to be output at 1 and the other values at 0 by using an argmax function in an output layer. The argmax function accepts input of a vector and converts the value of an element that has the largest value in the input vector to 1 and the values of the other elements to 0.

The attention vector generated by each round of the condition selection processing is formed into an attention vector that is different from any of an attention vector(s) that have/has been generated by the condition selection processing before the round. That is, $v_t$ is a vector different from any of $v_1, v_2, \ldots,$ and $v_{t-1}$.

Note that, in the first round of execution of S206, the generation unit 2040 inputs, as an initial value, a dummy vector that is prepared in advance. For example, the dummy vector is a vector all elements of which are zero.

Since S208 is the end of the loop processing, the processing in FIG. 11 returns to S204.

After the execution of the loop processing has been completed, the generation unit 2040 computes the total sum of the obtained K attention vector(s) (S210). A vector obtained as a result of the summation is referred to as a compound attention vector. As a result of the above-described loop processing, K attention vector(s) that is/are different from one another is/are obtained. Thus, the compound attention vector has a value of 1 for K element(s) therein and a value of 0 for the other elements. That is, the compound attention vector represents K candidate condition(s) that is/are selected by the condition generation RNN 70.

The generation unit 2040 acquires candidate condition information about the respective selected candidate condition(s) (S212). The generation unit 2040 generates a compound condition vector by determining whether the feature vector satisfies the respective selected candidate condition(s) by use of the acquired candidate condition information (S214). When the feature vector satisfies a candidate condition, the generation unit 2040 sets, in the compound condition vector, the value of an element corresponding to the candidate condition at 1. On the other hand, when the feature vector does not satisfy a candidate condition, the generation unit 2040 sets, in the compound condition vector, the value of an element corresponding to the candidate condition at −1. The value of an element corresponding to each candidate condition not selected by the condition generation RNN 70 (that is, an element the corresponding element of which in the compound attention vector has a value of 0) is also set at 0 in the compound condition vector.

Figure 12:
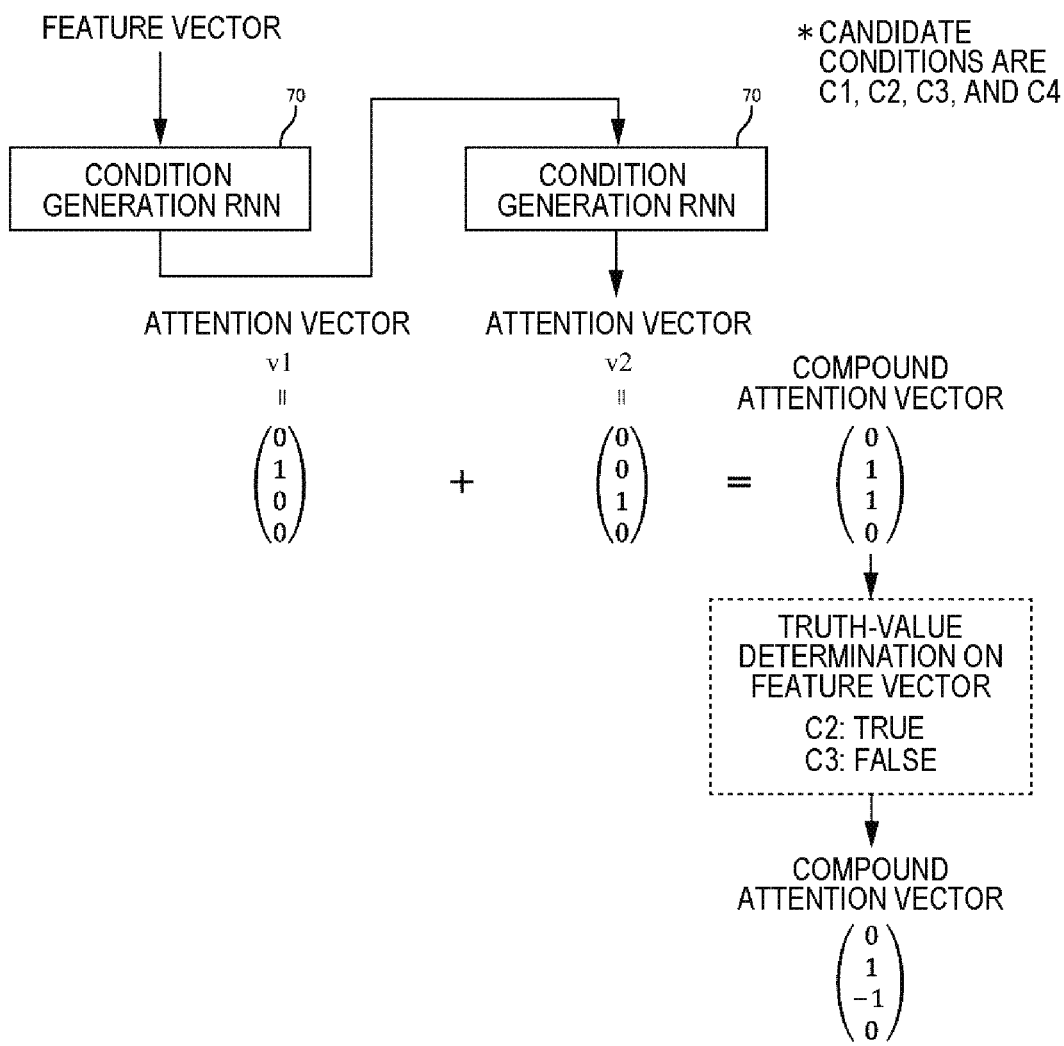
FIG. 12 is a diagram conceptually illustrating a flow in which a compound condition vector is generated by use of the condition generation RNN.

FIG. 12 is a diagram conceptually illustrating a flow in which a compound condition vector is generated by use of the condition generation RNN 70. Four candidate conditions C1 to C4 are defined. The number of candidate conditions to be selected is 2. Therefore, two attention vectors are generated. A first attention vector v1=(0, 1, 0, 0) is a vector the second element of which is 1. Therefore, in the first round of the condition selection processing, the condition c2 is selected. A second attention vector v2=(0, 0, 1, 0) is a vector the third element of which is 1. Therefore, in the second round of the condition selection processing, the condition c3 is selected.

Adding the above-described two attention vectors generates a compound attention vector (0, 1, 1, 0). The generation unit 2040 determines whether the feature vector extracted from the input data 10 satisfies the respective conditions C2 and C3. In the example in FIG. 12, C2 is satisfied (C2: true), and C3 is not satisfied (C3: false). Therefore, a compound condition vector (0, 1, −1, 0) is obtained.

<Determination of Example Data 40: S106>

The determination unit 2060 determines example data 40 that satisfy a condition(s) indicated by the condition data 50 and acquires correct answer data 42 associated with the determined example data 40 (S106). As described afore, information associating the example data 40 with the correct answer data 42 is referred to as example information. The example information is information that represents correct answers prepared in advance for prediction that the information processing apparatus 2000 performs.

FIG. 13 is a diagram illustrating a configuration of the example information in a table form. The table in FIG. 13 is referred to as a table 200. The table 200 includes example data 202 and correct answer data 204.

The example data 202 and the correct answer data 204 in each record indicate a piece of example data 40 and a piece of correct answer data 42 that are associated with each other. For example, it is assumed that the information processing apparatus 2000 outputs, in response to input of image data, the class of an object included the image data. In this case, the example information indicates feature vectors extracted from image data as the example data 202 and classes of objects included in the image data as the correct answer data 204. As described above, each record in the table 200 represents a specific feature vector and a correct answer for feature data expressed by the feature vector.

The example data 202 may indicate data to which feature vectors are converted. For example, it is assumed that candidate conditions are prepared in advance as combinations of an element, a threshold value, and an inequality sign. In this case, with respect to each example, whether a feature vector corresponding to the example satisfies the respective candidate conditions can be determined in advance. Thus, for example, the example data 202 are configured to indicate sets of flags each of which indicates whether a feature vector satisfies one of the plurality of candidate conditions. That is, instead of feature vectors being directly indicated as the example data 40, whether the feature vectors satisfy the respective candidate conditions are determined and sets of results of the determination are indicated as the example data 40.

FIG. 14 is a diagram illustrating another example of the example information. In the diagram, the example information indicates correct answers for feature vectors as correct answer data 204 and sets of flags indicating whether respective candidate conditions C1 to C4 are satisfied with respect to the feature vectors as example data 202.

When the example information is configured in a manner illustrated in FIG. 14, whether the example data 40 satisfy the respective condition(s) indicated by the condition data 50 can be more easily determined. In addition, respective elements of feature vectors can be said to have a large data size when compared with a true or false value, which can be represented by one bit. Therefore, when it is not necessary to use feature vectors themselves in examples, configuring example information in a manner illustrated in FIG. 14 enables the data size of the example information to be reduced.

Note that, as a technology to acquire data satisfying a predetermined condition from a storage apparatus or the like, any existing technology can be used. For example, the determination unit 2060 acquires desired correct answer data 42 by transmitting, to a database server in which example information is stored, a query expressing a search condition "to acquire correct answer data 204 for each record in which example data 202 satisfy condition(s) indicated by the condition data 50".

The determination unit 2060 may be configured to, instead of using all example data 40 that satisfy the condition(s) indicated by the condition data 50, use only some of the example data 40. For example, the number of pieces of example data 40 to be used for determination of prediction data 20 is set at a number equal to or less than a criterion number. In this case, the determination unit 2060 is configured to select, when the number of pieces of example data 40 that satisfy the condition(s) indicated by the condition data 50 is equal to or greater than the criterion number, a criterion number of pieces of example data 40 out of the example data 40. The selection is, for example, performed in a random manner.

<Determination of Prediction Data 20: S108>

The determination unit 2060 determines, by use of acquired correct answer data 42, prediction data 20. For example, the determination unit 2060 performs statistical processing on the acquired correct answer data 42 and determines data obtained as a result of the statistical processing as prediction data 20. A case where the information processing apparatus 2000 deals with a classification problem and a case where the information processing apparatus 2000 deals with a regression problem will be respectively described below.

<<Case of Dealing with Classification Problem>>

When the information processing apparatus 2000 deals with a classification problem, prediction data 20 are, for example, expressed by a label, which is an identifier of a class. When, for example, the class of an object included in image data is to be discriminated, the label is a label "person", "vehicle", or the like. In this case, it is assumed that the correct answer data 42 indicate labels. For example, the determination unit 2060 counts the number of appearances of each label in the acquired correct answer data 42 and determines a label the number of appearances of which is the largest as prediction data 20.

Figure 15:
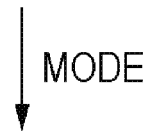

FIG. 15 is a diagram illustrating prediction data 20 when a classification problem is dealt with. In FIG. 15, 10 pieces of correct answer data 42 are acquired, and a label the number of appearances of which is the largest is A. Thus, the determination unit 2060 determines "A" as prediction data 20.

Alternatively, for example, data that represent, with respect to each class, a probability that the class is a correct answer (a probability distribution of the classes) may be used as prediction data 20. In this case, the determination unit 2060, for example, counts the numbers of appearances of respective classes among the acquired correct answer data 42 and computes probabilities of the respective classes by dividing the numbers of appearances by the total number of the acquired pieces of correct answer data 42.

For example, in the example in FIG. 15, the numbers of appearances of labels A, B, and C are 6, 3, and 1, respectively. Thus, the determination unit 2060 generates a probability distribution expressed as "A: 60%, B: 30%, C: 10%" as prediction data 20.

<<Case of Dealing with Regression Problem>>

When the information processing apparatus 2000 deals with a regression problem, prediction data 20 are, for example, expressed by a numerical value that has a predetermined meaning. In this case, the determination unit 2060 computes statistics (an average, a median, a mode, a maximum, a minimum, or the like) for correct answer data 42 and determines the computed statistics as prediction data 20.

FIG. 16 is a diagram illustrating prediction data 20 when a regression problem is dealt with. In FIG. 16, 10 pieces of correct answer data 42 are acquired, and each piece of correct answer data 42 indicates a numerical value. Thus, the determination unit 2060 computes the average of the numerical values and determines the computed average as prediction data 20.

<Variation of Determination Method of Prediction Data 20>

In the afore-mentioned description, prediction data 20 were determined by determining example data 40 that satisfy all condition(s) indicated by the condition data 50 and, computing prediction data 20 by use of correct answer data 42 associated with the determined example data 40.

However, the determination method of prediction data 20 is not limited to the method. A variation of the determination method of prediction data 20 will be described below.

<<Method of Using Example Data 40 Partially Satisfying Conditions Indicated by Condition Data 50>>

Example data 40 used to determine prediction data 20 do not necessarily have to be data that satisfy all condition(s) indicated by the condition data 50. That is, the determination unit 2060 may determine prediction data 20 by use of example data 40 that satisfy some of the condition(s) indicated by the condition data 50. For example, the determination unit 2060 computes, with respect to each piece of example data 40, a degree to which the piece of example data 40 satisfies the condition(s) indicated by the condition data 50. The degree is referred to as a condition satisfaction degree. The determination unit 2060 computes statistics for correct answer data 42 in such a way that a piece of correct answer data 42 associated with a piece of example data 40 having a higher condition satisfaction degree is provided with a larger weight. The statistics is determined as prediction data 20.

Figure 19:
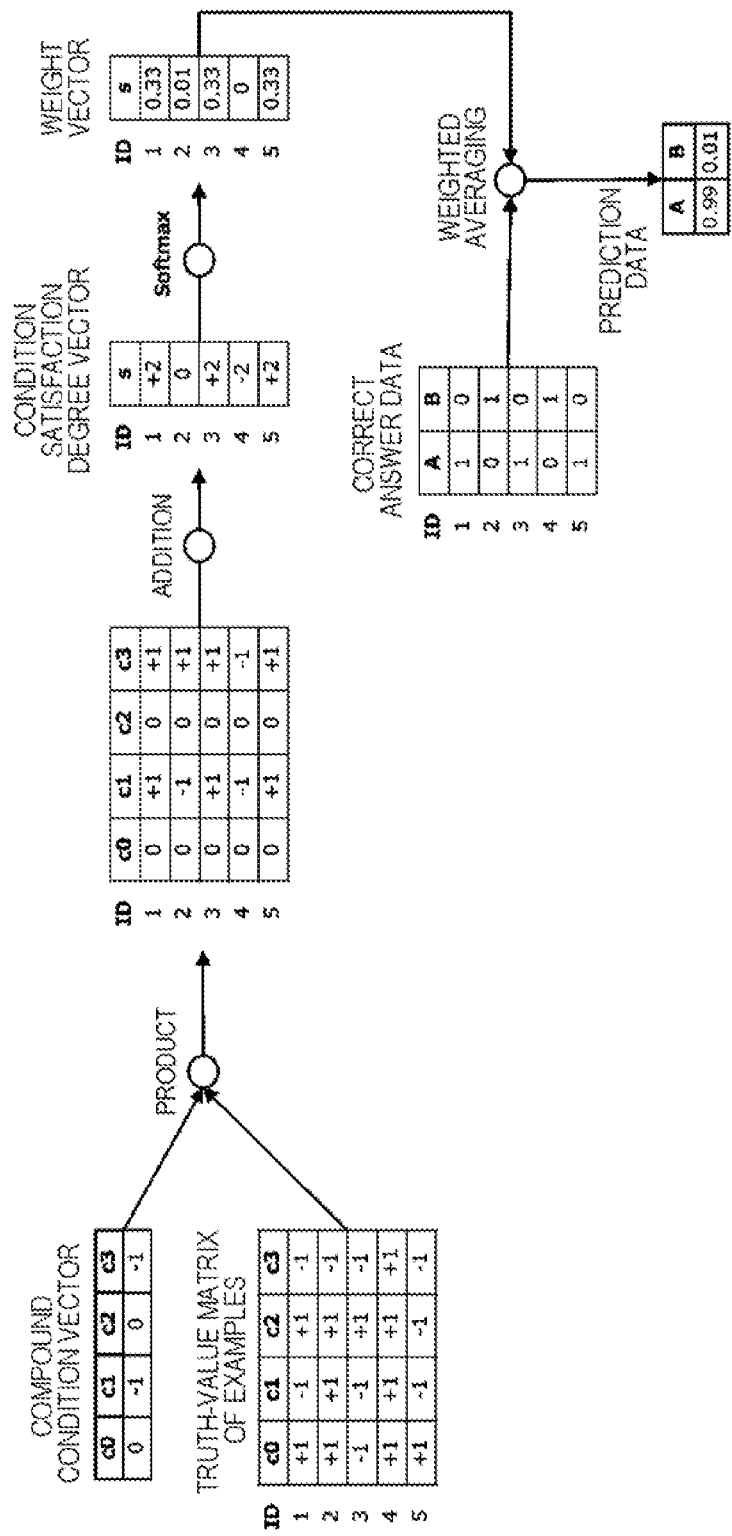
FIG. 19 is a diagram conceptually illustrating processing of determining, by use of condition satisfaction degrees, prediction data.

FIG. 19 is a diagram conceptually illustrating processing of determining, by use of condition satisfaction degrees, prediction data 20. In FIG. 19, a truth-value matrix indicates whether example data 40 satisfy respective candidate conditions. Note that a compound condition vector and the truth-value matrix may have only an element(s) corresponding to a selected candidate condition(s) instead of elements corresponding to all candidate conditions.

The determination unit 2060 computes the product of the compound condition vector and the truth-value matrix. A matrix resulting from the computation indicates whether the example data 40 satisfy the respective condition(s) indicated by the condition data 50. A value of 1 is indicated when a piece of example data 40 satisfies a condition, and a value of −1 is indicated when a piece of example data 40 does not satisfy the condition. For example, in FIG. 19, a piece of example data 40 having ID=1 satisfies both a condition relating to C1 ($\neg$C1) and a condition relating to C3 ($\neg$C3).

The determination unit 2060 generates a condition satisfaction degree vector by adding up values in all columns for each row in the computed matrix. Each element of the condition satisfaction degree vector indicates a condition satisfaction degree with respect to a corresponding piece of example data 40.

The determination unit 2060 generates a weight vector by applying a Softmax function to the condition satisfaction degree vector. Due to characteristics of a Softmax function, the value of each element of the weight vector has characteristics as follows: 1) the larger the corresponding element of the condition satisfaction degree vector is, the larger the value of the element becomes; 2) the value of the element is equal to or greater than 0 and equal to or less than 1; and 3) the total sum of the values of the elements in the weight vector is 1.

The determination unit 2060 computes prediction data 20 by performing statistical processing (for example, weighted averaging) in which weights indicated in the weight vector are applied to correct answer data 42 corresponding to the respective example data 40.

According to the above-described method, example data 40 that satisfy only some of the condition(s) indicated by the condition data 50 are also taken into consideration in the determination of prediction data 20. This configuration enables a stable prediction result to be obtained even when the number of pieces of example data 40 that satisfy all the condition(s) indicated by the condition data 50 is small.

Note that the determination unit 2060 may use the above-described method without exception or use the above-described method only when the number of pieces of example data 40 that satisfy all the condition(s) indicated by the condition data 50 is less than a criterion number.

The method in which example data 40 that satisfy only some of the condition(s) indicated by the condition data 50 are also used is not limited to the above-described method. For example, the determination unit 2060 may be configured to exclude some condition(s) from the condition(s) indicated by the condition data 50. Examples of a specific method for the exclusion include various methods. For example, when the afore-described condition generation RNN 70 is used as the condition generation neural network 34, the determination unit 2060 is configured to exclude a candidate condition(s) in reverse order of time of selection while keeping the number of pieces of example data 40 that satisfy a condition(s) indicated by the condition data 50 equal to or greater than a criterion number. In other words, it is configured such that the earlier a candidate condition is selected, the more unlikely the candidate condition is to be excluded. Since a candidate condition that the condition generation RNN 70 selected earlier is considered to be a more important condition, this configuration enables conditions having higher importance to be kept in the condition data 50 in a prioritized manner.

Alternatively, for example, the determination unit 2060 is configured to exclude a condition(s) in descending order of increments in the number of pieces of example data 40 due to exclusion of a condition from the condition data 50. For example, it is assumed that conditions C1 to C3 are included in the condition data 50 and the number of pieces of example data 40 increases by 10 when the condition C1 is excluded, the number of pieces of example data 40 increases by 5 when the condition C2 is excluded, and the number of pieces of example data 40 increases by 15 when the condition C3 is excluded. In this case, the condition C3 the exclusion of which causes the number of pieces of example data 40 to increase by the largest number is configured to be excluded from the condition data 50. This configuration enables the number of conditions to be excluded from the condition data 50 to be suppressed to as small a number as possible. In other words, it is possible, while leaving as many conditions as possible in the condition data 50, to keep the number of pieces of example data 40 equal to or greater than a criterion number.

<<Method of Using Predetermined Value as Prediction Data 20>>

Prediction data 20 that satisfy a condition(s) indicated by condition data 50 may be determined in advance. For example, by computing, for each of a plurality of conditions that may be generated as condition data 50, prediction data 20 from correct answer data 42 by use of the afore-described method, prediction data 20 corresponding to the conditions are obtained in advance. Associations between condition data 50 and prediction data 20 are stored in advance in a storage apparatus that is accessible from the determination unit 2060. When in operation, the determination unit 2060 determines prediction data 20 by acquiring prediction data 20 associated with the condition data 50 generated by the generation unit 2040 from the storage apparatus. This configuration enables the processing of determining prediction data 20 to be sped up.

Alternatively, for example, a plurality of combinations of condition data 50 and prediction data 20 may be obtained by using input data prepared separately for test, and the obtained combinations may be stored in the storage apparatus. Specifically, input data for test are input to the information processing apparatus 2000 as input data 10, and the information processing apparatus 2000 is made to perform processing of generating condition data 50 and processing of computing prediction data 20 from correct answer data 42. Combinations of condition data 50 and prediction data 20 obtained as a result of the processing are stored in the storage apparatus. When in operation, the determination unit 2060 determines prediction data corresponding to the input data 10 by acquiring prediction data 20 associated with the condition data 50 generated by the generation unit 2040 from the storage apparatus.

Note that combinations of condition data 50 and prediction data 20, which are to be stored in the storage apparatus, may be narrowed down by use of a method such as frequent pattern mining. For example, it is configured such that, among combinations of condition data 50 and prediction data 20 obtained by use of input data for test, only combinations the frequency of which is equal to or greater than a predetermined value are stored in the storage apparatus. This configuration, while enabling prediction with high precision to be achieved, enables storage capacity of the storage apparatus to be reduced.

In the above-described method in which combinations of condition data 50 and prediction data 20 are obtained by use of input data for test that are prepared in advance, all conditions that may be generated as condition data 50 when in operation are not necessarily obtained. Thus, for example, the determination unit 2060 when in operation is configured to, when prediction data 20 associated with generated condition data 50 are stored in the storage apparatus, acquires and uses the prediction data 20 and, when not stored, acquires correct answer data 42, based on the condition data 50 and compute prediction data 20.

Alternatively, for example, the condition generation neural network 34 to be used in actual operation may be made to learn in such a way that each output of the condition generation neural network 34 corresponds to one of pieces of condition data 50 generated in advance. That is, the condition generation neural network 34 performs output operation of selecting one of the pieces of condition data 50 generated in advance. The determination unit 2060 acquires, from the storage apparatus, prediction data 20 that are stored in association with the condition data 50 selected by the condition generation neural network 34. The determination unit 2060 determines the acquired prediction data 20 as prediction data 20 corresponding to the input data 10.

Figure 21:
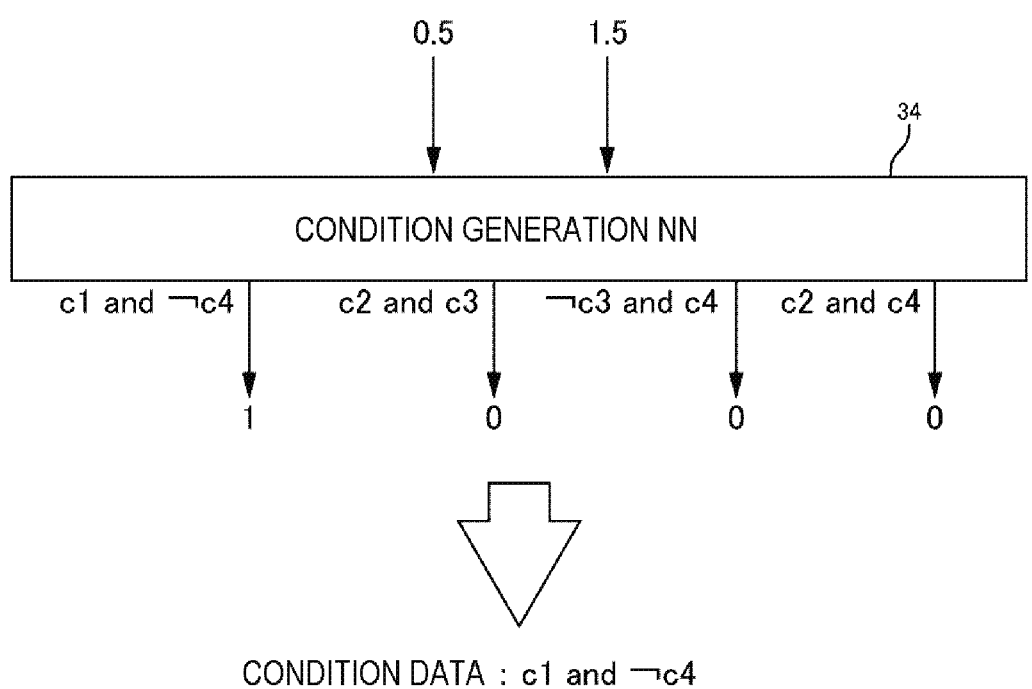
FIG. 21 is a diagram illustrating a case of selecting condition data generated in advance by use of the condition generation neural network.

FIG. 21 is a diagram illustrating a case of selecting condition data 50 generated in advance by use of the condition generation neural network 34. In FIG. 21, as condition data 50 for which associated prediction data 20 are determined in advance, pieces of condition data 50 expressed as "C1 and ¬c4", "c2 and c3", "¬c3 and c4", and "c2 and c4" are defined. The condition generation neural network 34 outputs 1 from an output node corresponding to a piece of condition data 50 to be selected and outputs 0 from the other output nodes. In FIG. 21, 1 is output from the output node corresponding to the piece of condition data 50 "C1 and ¬c4", which indicates that the piece of condition data 50 is selected.

It may be configured such that, when the determination unit 2060 determines prediction data 20 by use of correct answer data 42, a combination of condition data 50 and the prediction data 20 is stored in the storage apparatus as cache data. In this case, when condition data 50 that were generated by the generation unit 2040 in the past are generated by the generation unit 2040 again, the determination unit 2060 is able to obtain the prediction data 20 rapidly by acquiring the prediction data 20 associated with the condition data 50 from the storage apparatus.

<Output of Prediction Rule>

Figure 17:
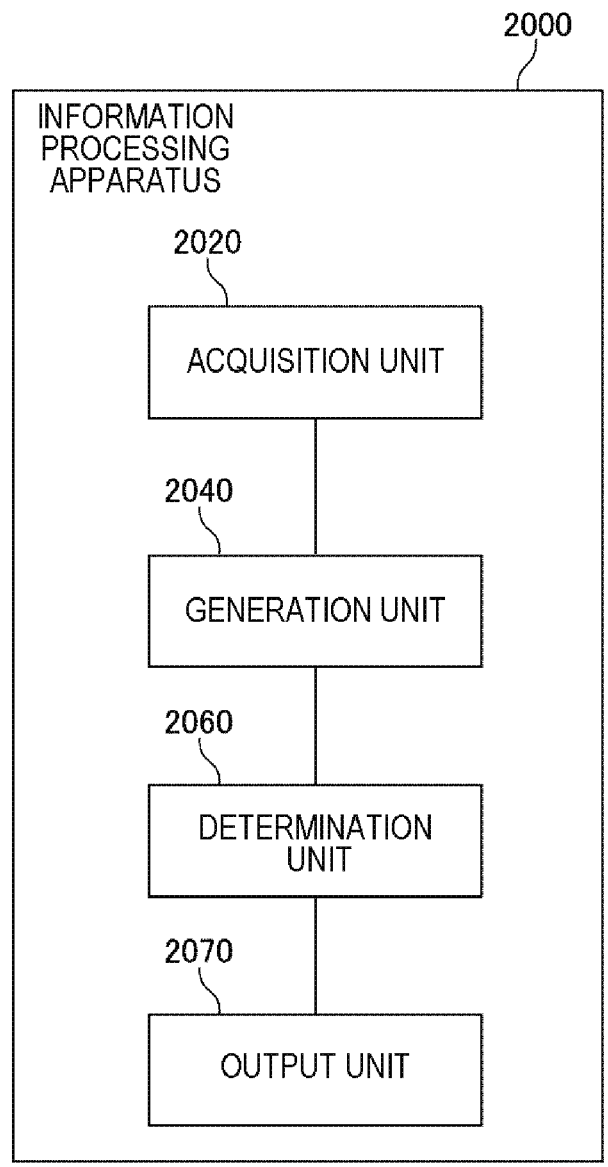
FIG. 17 is a block diagram illustrating the information processing apparatus including a prediction rule output unit.

The information processing apparatus 2000 may have a function of outputting a prediction rule that represents a combination of condition data 50 and prediction data 20. A functional constituent unit configured to achieve a function of generating and outputting a prediction rule is referred to as an output unit 2070. FIG. 17 is a block diagram illustrating the information processing apparatus 2000 including the output unit 2070.

A prediction rule is, for example, a rule constituted by two parts, namely a condition part and a conclusion part. The condition part and the conclusion part indicate condition data 50 and prediction data 20, respectively. For example, when the condition data 50 is "x1>0 and x2<2" and the prediction data 20 is "A", a prediction rule expressed as "x1>0 and x2<2→A" is generated.

The condition data 50 can be said to represent a reason for the information processing apparatus 2000 determining the prediction data 20 as a predicted value for input data 10 (a criterion for determining the prediction data 20). In other words, the condition data 50 can be said to represent an interpretation of the input data 10 by the information processing apparatus 2000. Therefore, by referring to the above-described prediction rule, users can easily recognize based on what criterion the prediction data 20 are determined as a predicted value for the input data 10 (in what way the input data 10 were interpreted).

Note that condition data 50 generated by the information processing apparatus 2000 depend on input data 10. Thus, a prediction rule may indicate input data 10 in addition to condition data 50 and prediction data 20. For example, when the input data 10 is D1, the condition data 50 is "x1>0 and x2<2", and the prediction data 20 is "A", a prediction rule expressed as "input: D1, rule: x1>0 and x2<2→A" is generated.

Figure 18:
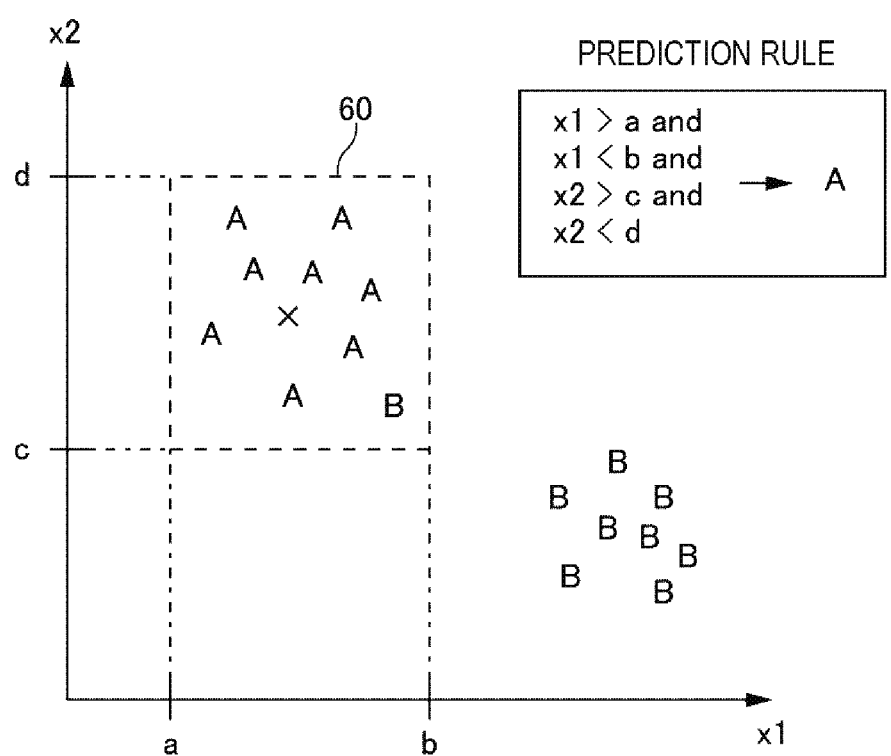
FIG. 18 is a diagram illustrating an example in which a prediction rule is output in a graphical manner.

Note that prediction data to be output are not limited to data that are, as described above, expressed by a character string and may be expressed by use of a graph or the like. FIG. 18 is a diagram illustrating an example in which a prediction rule is output in a graphical manner. A feature vector extracted from input data 10 is represented by a cross mark. Example data 40 are represented by characters expressing associated correct answer data 42. Condition data 50 are illustrated as a region 60. Users who refer to the graphical representation are able to easily understand that a lot of pieces of correct answer data 42 expressed as "A" are included in the region 60 to which the input data 10 belong. Therefore, the users are able to easily understand that a predicted result "A" is correct and in what manner the predicted result was derived.

Note that, when a graphical representation like the one in FIG. 18 is displayed, the output unit 2070 may be configured to display all example data 40 that were used in the determination of prediction data 20 or display only some of the example data 40. In the latter case, the output unit 2070, for example, selects a predetermined number of pieces of example data 40 at random out of the example data 40 used in the determination of the prediction data 20 and performs display of the selected example data 40.

The output unit 2070 may also display example data 40 that do not satisfy a condition(s) indicated by the condition data 50 (example data 40 that are not included in the region 60). In this case, the output unit 2070 preferably displays example data 40 in the vicinity of the region 60 in a prioritized manner. For example, the output unit 2070 determines example data 40 in the vicinity of the region 60 by searching for example data 40 while shifting a threshold value(s) of the condition(s) indicated by the condition data 50 by a predetermined value(s) (relaxing the condition(s)) in such a way that the region 60 is enlarged.

Examples of the method by which the output unit 2070 outputs a prediction rule include various method. For example, the output unit 2070 displays a prediction rule on a display apparatus. Alternatively, for example, the output unit 2070 may store a prediction rule in a storage apparatus. Still alternatively, for example, when a user accesses the information processing apparatus 2000 from another terminal, the information processing apparatus 2000 may transmit a prediction rule to the another terminal.

Second Example Embodiment

An information processing apparatus 2000 of a second example embodiment further has a function of performing training of a neural network 30. That is, the information processing apparatus 2000 of the second example embodiment has a function of updating internal parameters of the neural network 30 in such a way as to decrease prediction loss on the output of the neural network 30.

Figure 20:
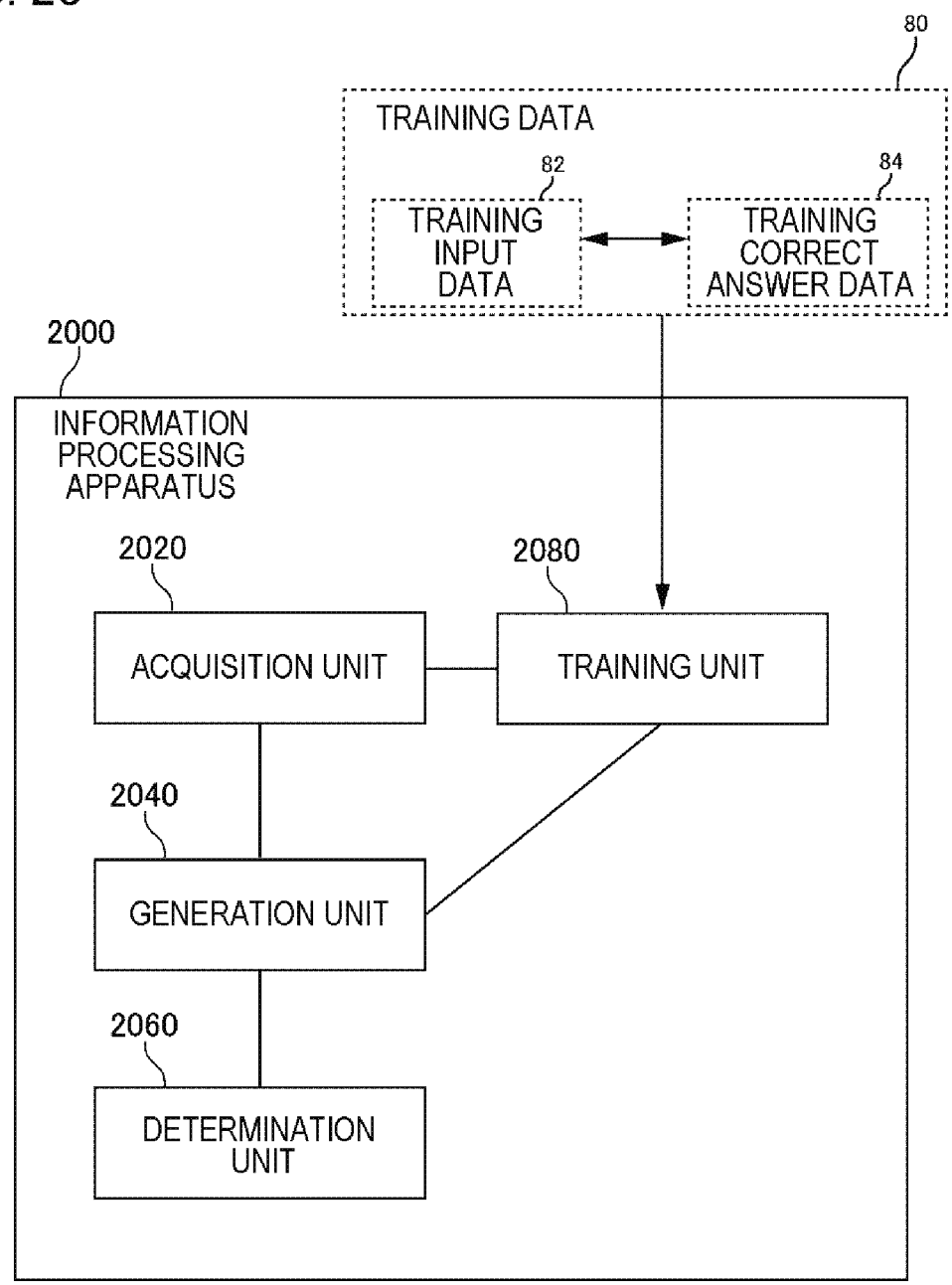
FIG. 20 is a block diagram illustrating a functional configuration of an information processing apparatus of a second example embodiment.

For this purpose, the information processing apparatus 2000 includes a training unit 2080. FIG. 20 is a block diagram illustrating a functional configuration of the information processing apparatus 2000 of the second example embodiment. The training unit 2080 trains the neural network 30 by updating parameters of the neural network 30 by use of backpropagation.

A specific method by which the training unit 2080 trains the neural network 30 will be described below.

The training unit 2080 acquires training data 80. The training data 80 are data in which training input data 82 and training correct answer data 84 are associated with each other. The training input data 82 are the same type of data as input data 10. That is, when the information processing apparatus 2000 deals with image data as input data 10, the training input data 82 are also image data. The training correct answer data 84 are data representing correct answers with respect to the training input data 82 and are the same type of data as correct answer data 42. For example, it is assumed that the information processing apparatus 2000 predicts the class of an object included in the input data 10. In this case, the training correct answer data 84, for example, indicate the classes of objects included in the training input data 82.

The training unit 2080 acquires prediction data 20 by inputting the training input data 82 to an acquisition unit 2020. The training unit 2080 computes a prediction loss with respect to the obtained prediction data 20 and the training correct answer data 84. As the prediction loss, for example, general prediction loss (mean square error, cross-entropy loss, or the like) that is used in the training of a neural network can be used.

The training unit 2080 updates parameters of the neural network 30 by performing backpropagation processing in such a way as to reduce the computed prediction loss. In the update, the training unit 2080 performs at least update of parameters of a condition generation neural network 34 (performs training of the condition generation neural network 34). With regard to a feature extraction neural network 32, training by the training unit 2080 may be performed or does not have to be performed. In the latter case, the training of the feature extraction neural network 32 is performed in advance by means of a separate method. As described afore, as the training of the feature extraction neural network 32, any existing method can be used.

Note that operation of the neural network 30 may be differentiated between when the training is performed by the training unit 2080 (hereinafter, referred to as a training phase) and when the information processing apparatus 2000 is actually operated (hereinafter, referred to as a test phase). For example, in the condition generation RNN 70 that was described as a specific example of the condition generation neural network 34 in the first example embodiment, attention vectors were generated by use of an argmax function. However, in general, the argmax function is said to be a function that makes it difficult to perform backpropagation.

Thus, for example, the condition generation neural network 34 in the training phase, that is, the condition generation neural network 34 when used by the training unit 2080, is configured to generate attention vectors by use of a function that makes it possible to perform backpropagation in place of an argmax function. For example, it is suitable to generate attention vectors by use of a softmax function. The softmax function can be considered to be a continuous approximation of an argmax function. Therefore, use of a softmax function, while enabling attention vectors close to an argmax function (attention vectors close to one-hot vectors) to be generated, enables backpropagation to be easily performed.

Note that it is particularly useful to use a softmax function with a temperature parameter. The use of a softmax function with a temperature parameter enables an output that is close to an output from an argmax function to be obtained.

The formula (2) below is a formula expressing a softmax function with a temperature parameter. Setting temperature τ at a small value, such as 0.1, enables attention vectors close to one-hot vectors to be computed.

[Math. 2]

$$a_{i,t} = \frac{\exp(e_{i,t}/\tau)}{\sum_i \exp(e_{i,t}/\tau)} \quad (2)$$

In the above formula, a_(i, t) denotes a value of the i-th element of an attention vector generated in the t-th round of loop processing. In addition, e_(i, t) denotes a value to be input to the output layer of the condition generation RNN 70 in the t-th round of the loop processing and is a value to be input to the node that outputs the i-th element of the attention vector.

Alternatively, a Gumbel-Softmax function or an ST Gumbel-Softmax function, which is a variant of the Gumbel-softmax function, may be used. The Gumbel-softmax function is a function that performs sampling in accordance with a continuous probability distribution and generates a vector close to a one-hot vector. Although almost the same candidate conditions are selected in respective rounds of execution when a Softmax function with a temperature parameter is used, a different combination of candidate conditions can be sampled in each round of execution when a Gumbel-Softmax function is used. Therefore, it is possible to perform training of the condition generation neural network 34 in a more appropriate manner.

The training unit 2080 generates a compound attention vector that is the total sum of a plurality of attention vectors output by the condition generation neural network 34. Further, the training unit 2080 generates a compound condition vector from the compound attention vector. Each element of the compound condition vector generated by the training unit 2080 has continuous values equal to or greater than −1 and equal to or less than +1, differing from the one described in the first example embodiment. With regard to an element corresponding to a candidate condition that is satisfied by a feature vector extracted from the training input data 82, the value of the element in an attention vector is set to the compound condition vector as it is. On the other hand, with regard to an element corresponding to a candidate condition that is not satisfied by the feature vector extracted from the training input data 82, a value obtained by multiplying the value of the element in an attention vector by −1 is set to the compound condition vector.

For example, the training unit 2080 generates prediction data for training (hereinafter, referred to as training prediction data) by use of the method that was described by use of FIG. 19 in the first example embodiment, that is, the method using a condition satisfaction degree. Use of the method enables training prediction data to be generated even when the compound condition vector has continuous values. Note that, when a regression problem is dealt with, training prediction data generated by the training unit 2080, as with prediction data 20, have continuous values. On the other hand, when a classification problem is dealt with, the training unit 2080 outputs, with respect to each class, a value representing probability of the class as training prediction data. That is, the training prediction data become a vector having the same number of elements as the total number of classes.

The training unit 2080 computes a prediction loss with respect to the training prediction data and the training correct answer data 84 and performs backpropagation, based on the computed prediction loss. As a method for computing a prediction loss with respect to prediction data generated for training and correct answer data prepared for training and a technology to perform backpropagation, based on the computed prediction loss, any existing technology can be used.

Example of Hardware Configuration

A hardware configuration of a computer that achieves the information processing apparatus 2000 of the second example embodiment is, as with the first example embodiment, illustrated by FIG. 6. Note, however, that, in a storage device 1080 in a computer 1000 that achieves the information processing apparatus 2000 of the present example embodiment, program modules that achieve the functions of the information processing apparatus 2000 of the present example embodiment are further stored.

While the example embodiments of the present invention have been described above with reference to the drawings, the example embodiments are only exemplification of the present invention and a configuration into which the configurations of the above-described example embodiments are combined and various configurations other than the above-described example embodiments can also be employed.

The invention claimed is:

1. An information processing apparatus comprising:
at least one memory configured to store instructions; and
at least one processor configured to execute the instructions to perform operations comprising:
acquiring input data;
generating, by use of a neural network, condition data that indicate one or more conditions satisfied by the input data;
determining, as prediction data associated with the input data, a value determined based on correct answer data associated with example data that satisfy at least a part of the one or more conditions indicated by the condition data; and
updating a parameter of the neural network, wherein
a plurality of candidate conditions that are candidates of conditions to be included in the condition data are defined,
the prediction data associated with the input data is determined by acquiring, from a storage apparatus storing a plurality of the prediction data in respective a plurality of combinations of one or more candidate conditions of the plurality of candidate conditions, the prediction data associated with a combination of candidate conditions included in the generated condition data.

2. The information processing apparatus according to claim 1, wherein
the neural network outputs, in response to input of the input data, information representing the candidate conditions to be included in the condition data, and
generating the condition data comprises setting a compound condition representing a logical product of the candidate conditions represented by output from the neural network as a condition indicated by the condition data.

3. The information processing apparatus according to claim 2, wherein
the candidate conditions indicate, with respect to each of a plurality of elements acquired from the input data, a combination of a threshold value and a magnitude relation.

4. The information processing apparatus according to claim 2, wherein
generating the condition data comprises repeatedly performing input to the neural network and determining, based on information output each of a plurality of times the input is performed, the candidate conditions to be included in the condition data.

5. The information processing apparatus according to claim 1, wherein the operations further comprise:
outputting a prediction rule in which a condition indicated by the condition data is associated with the prediction data.

6. The information processing apparatus according to claim 5, wherein the operations further comprise:
outputting information representing the example data that satisfy a condition indicated by the condition data.

7. The information processing apparatus according to claim 1, wherein the operations further comprise:
acquiring training input data and training correct answer data;

acquiring the condition data by inputting setting the training input data as the input data;

acquiring the correct answer data associated with the example data that satisfy at least a part of conditions indicated by the acquired condition data and determining prediction data by use of the correct answer data; and computing a prediction loss with respect to the determined prediction data and the training correct answer data, and updating the parameter of the neural network comprises updating the parameter of the neural network in such a way that the prediction loss decreases.

8. A control method performed by a computer, the method comprising:

acquiring input data;

generating, by use of a neural network, condition data that indicate one or more conditions satisfied by the input data;

determining, as prediction data associated with the input data, a value determined based on correct answer data associated with example data that satisfy at least a part of the one or more conditions indicated by the condition data; and updating a parameter of the neural network, wherein a plurality of candidate conditions that are candidates of conditions to be included in the condition data are defined, the prediction data associated with the input data is determined by acquiring, from a storage apparatus storing a plurality of the prediction data in respective a plurality of combinations of one or more candidate conditions of the plurality of candidate conditions, the prediction data associated with a combination of candidate conditions included in the generated condition data.

9. The control method according to claim 8, wherein the neural network outputs, in response to input of the input data, information representing the candidate conditions to be included in the condition data, and generating the condition data comprises setting a compound condition representing a logical product of the candidate conditions represented by output from the neural network as a condition indicated by the condition data.

10. The control method according to claim 9, wherein the candidate conditions indicate, with respect to each of a plurality of elements acquired from the input data, a combination of a threshold value and a magnitude relation.

11. The control method according to claim 9, wherein generating the condition data comprises repeatedly performing input to the neural network and determining, based on information output each of a plurality of times the input is performed, the candidate conditions to be included in the condition data.

12. The control method according to claim 8, further comprising outputting a prediction rule in which a condition indicated by the condition data is associated with the prediction data.

13. The control method according to claim 12, wherein outputting further comprises outputting information representing the example data that satisfy a condition indicated by the condition data is further output.

14. The control method according to claim 8, further comprising;

acquiring training input data and training correct answer data;

acquiring the condition data by setting the training input data as the input data;

acquiring the correct answer data associated with the example data that satisfy at least a part of conditions indicated by the acquired condition data and determining prediction data by use of the correct answer data; and computing a prediction loss with respect to the determined prediction data and the training correct answer data, wherein updating the parameter of the neural network comprises updating the parameter of the neural network in such a way that the prediction loss decreases.

15. A non-transitory storage medium storing a program causing a computer to execute the control method according to claim 8.

* * * * *